United States Patent [19]

Masuda et al.

[11] Patent Number: 5,251,299
[45] Date of Patent: Oct. 5, 1993

[54] SYSTEM FOR SWITCHING BETWEEN PROCESSORS IN A MULTIPROCESSOR SYSTEM

[75] Inventors: Hiroki Masuda; Yoso Igi, both of Yokohama; Koji Eto, Tokyo, all of Japan

[73] Assignee: Fujitsu Limited, Kawasaki, Japan

[21] Appl. No.: 523,823

[22] Filed: Mar. 19, 1990

Related U.S. Application Data

[63] Continuation of Ser. No. 947,410, Dec. 29, 1986, abandoned.

[30] Foreign Application Priority Data

Dec. 28, 1985 [JP] Japan ................................ 60-293482
Dec. 28, 1985 [JP] Japan ................................ 60-293483

[51] Int. Cl.$^5$ ..................... G06F 13/00; G06F 11/00
[52] U.S. Cl. ..................... 395/200; 364/229; 364/229.2; 364/268; 364/268.3; 364/DIG. 1; 364/931.4; 364/940.2; 364/944; 364/DIG. 2; 395/575

[58] Field of Search ... 364/200 MS File, 900 MS File, 364/DIG. 1, DIG. 2; 395/200, 575

[56] References Cited

U.S. PATENT DOCUMENTS 4,455,601  6/1984  Griscom et al. ............... 395/575
4,654,784  3/1987  Campanini ..................... 395/325

Primary Examiner—Thomas C. Lee
Assistant Examiner—Maria N. Von Buhr
Attorney, Agent, or Firm—Staas & Halsey

[57] ABSTRACT

A multiprocessor system is provided with main processors and secondary processors, and the processors are duplexed to form an active system and a standby system. A right to switch the system is given only to the main processors, and the secondary processors are operative to switch the system in accordance with the related system switching command, wherein data and control information are independently communicated between the main processors and the corresponding secondary processors belonging to the same active or standby system.

21 Claims, 23 Drawing Sheets

① NOTIFICATION OF COMPLETION OF DATA TRANSFER

③ PERIODIC TEST

② EXCHANGE PROCESSING (DATA COMMUNICATION)

① PH1 ACTIVATION MESSAGE
FAULT HOPPER

CC SWITCHING FLAG
② MEMA
③ PH1 ACTIVATION MESSAGE

① REPLY TO PH1 ACTIVATION MESSAGE

CC SWITCHING FLAG
FAULT HOPPER
④ EXCHANGE PROCESSING

SYSTEM FOR SWITCHING BETWEEN PROCESSORS IN A MULTIPROCESSOR SYSTEM

This is a continuation of co-pending application Ser. No. 06/947,410, filed on Dec. 29, 1986, now abandoned.

BACKGROUND OF THE INVENTION

The present invention relates to a multiprocessor system, more particularly to a multiprocessor system suitable for use in an electronic switching system.

Electronic switching systems may, for example, be roughly divided into network portions which actually perform the circuit switching or packet switching and processor portions which manage the network portions and perform call processing control. The present invention particularly relates to the latter processor portion.

This processor portion may fundamentally be a single processor, but when the electronic switching system is large in scale, the network portion also becomes large, and accordingly a plurality of processors are introduced. These processor include several secondary processors and a main processor for exercising overall control over the secondary processors, which all together make up a single multiprocessor system. To improve the reliability of the multiprocessor system, the technique of duplexing is introduced. That is, the constituent elements (processors and buses) are duplexed into a 0 system (active system) and 1 system (standby system), with one backing up the other.

The above method of system construction is based on the so-called "one-machine concept", and is extremely flexible with regard to changes from a single processor to multiple processors and further to a duplex construction. For example, it is an extremely efficient method of coping with enlargements of scale of private branch exchanges (PBX). Therefore, it is considered that such multiprocessor system will come into wide use in the future.

As explained above, for duplexed multiprocessor systems, in an electronic switching system, there are single management processors (the aforementioned main processors) and pluralities of call processors (the afore-mentioned secondary processors for call processing), all of which are duplexed. In such as case, the switching of systems among the 0 system and 1 system processors is an important operation. In the past, the method used for this system switching operation was to grant the right to system switching to the call processors. In other words, any call processor could select the 0 system or 1 system.

According to the conventional method for system switching of the duplexed multiprocessor system, for the order of control among the call processors and the management processors, the software had to be managed each time the call processors exercised the system switching rights. In the end, this resulted in the disadvantage of complicating the software management.

SUMMARY OF THE INVENTION

An object of the present invention is to provide a multiprocessor system in which there are pluralities of secondary processors, single main processors for exercising overall control over the secondary processors, and single system control buses, together with single system communication buses, in which processors and buses are duplexed to form an active system and a standby system, wherein respective duplexed multiprocessors can execute switching from the 0 system to 1 system or vice versa without the software management becoming complicated and without the introduction of complicated hardware. Use for an electronic switching system results in much greater effectiveness of the system.

To attain the above object, a first means for achieving system switching control is mounted in each of the main processors and a second means for executing system switching is mounted in each of the secondary processors, the second means being activated in response to a command given from the first means.

BRIEF DESCRIPTION OF THE DRAWINGS

The above and other objects and features of the present invention will become more apparent from the following description of the preferred embodiments with reference to the accompanying drawings, wherein.

DETAILED DESCRIPTION OF THE PREFERRED EMBODIMENTS

Figure 1:
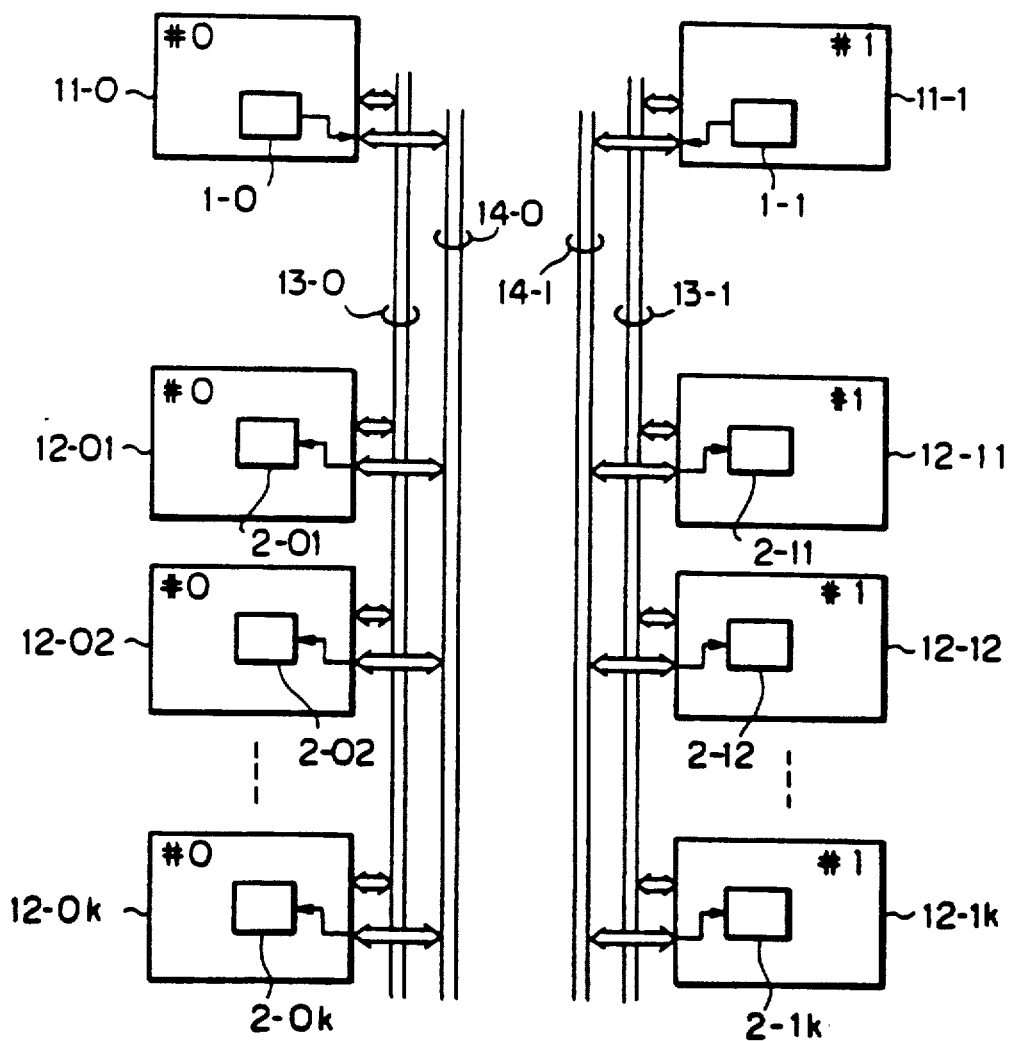
FIG. 1 is an explanatory view illustrating a basic multiprocessor system according to the present invention.

FIG. 1 is an explanatory view illustrating a basic multiprocessor system according to the present invention. In the figure, 11-0 is a 0 system main processor and 11-1 a 1 system main processor, each governing and managing a plurality of 0 system secondary processor 12-01 to 12-0k and a plurality of 1 system secondary processors 12-11 to 12-1k, respectively. Among these processors are connected 0 system and 1 system communication buses 13-0 and 13-1 for principally transferring data. Further, among these processors are connected 0 system and 1 system, system-control buses 14-0 and 14-1 principally for the transmission of control signals. Here, constraint is applied so that all the processors of the 0 system and all the buses of the 0 system send and receive data and control signals in the 0 system only, and all the processors of the 1 system and all the buses of the 1 system send and receive data and control signals in the 1 system only. This is a precondition of the present invention. In other words, communication is only possible among elements of the same system. By constraining communication to be only among elements of the same system in this way, the amount of hardware can be considerably reduced and the software management can be made considerably easier.

Another important precondition is that the secondary processors (12) not be given any system switching rights and that only the main processors (11) exercise system switching rights. This can overcome the above-mentioned problem of the prior art.

Further, the present invention includes two means. The first means 1-0, 1-1 for achieving system switching control are mounted in the 0 system and 1 system main processors 11-0 and 11-1, respectively. The second means 2-01 through 2-0k for executing the system switching are mounted in the 0 system secondary processors 12-01 through 12-0k, respectively. Also, the second means 2-11 through 2-1k for executing the system switching are mounted in the 1 system secondary processors 12-11 through 12-1k, respectively. Each of the second means (2) is activated in response to a command given the first means (1).

Figure 2:
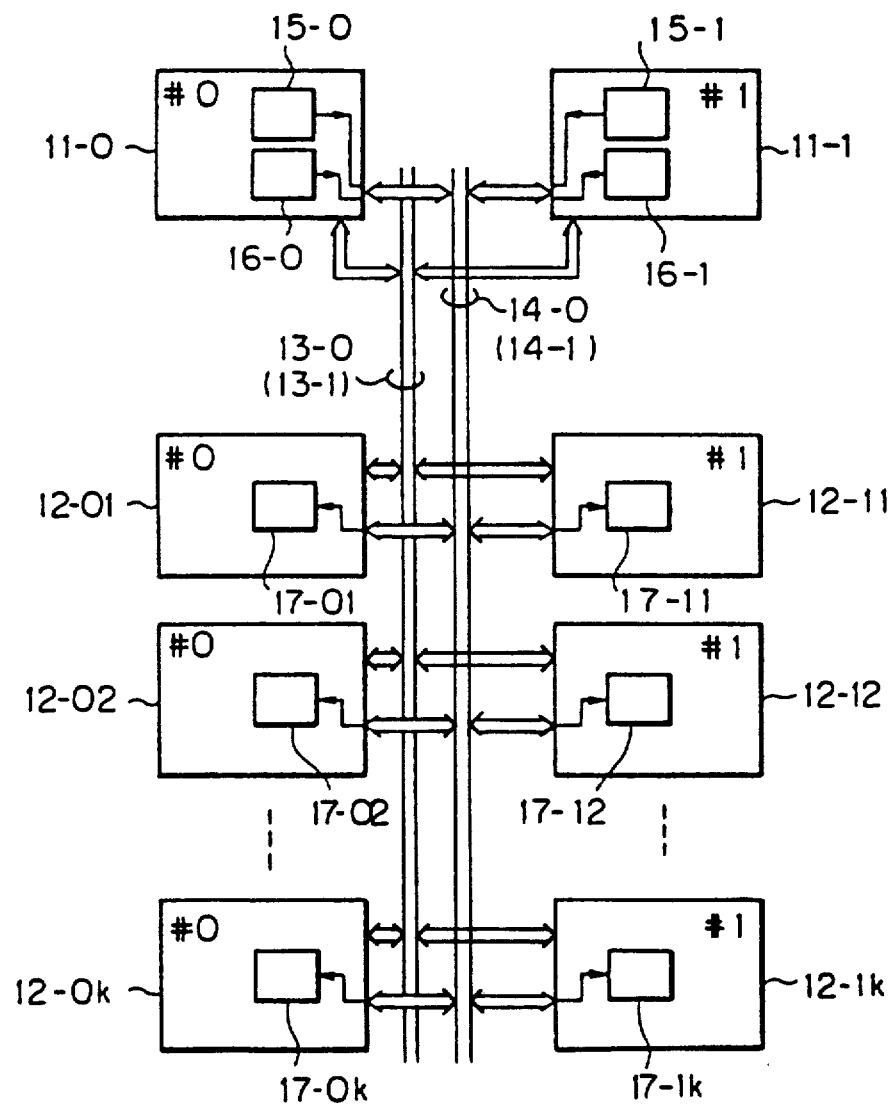
FIG. 2 is an explanatory view of the multiprocessor system according to a first embodiment of the present invention.

FIG. 2 is an explanatory view of the multiprocessor system according to a first embodiment of the present invention. In the first embodiment, the first means 1-0 and 1-1 of FIG. 1 respectively include both 0 system and 1 0 system, system switching instruction transmission units 15-0, 15-1 and both 0 system and 1 system, system switching notification units 16-0, 16-1.

The 0 system and 1 system, system switching instruction units 15-0 and 15-1 are provided inside the main processors 11-0 and 11-1, respectively, and function to send commands, i.e., system switching instructions from the main processors 11 (0 system and 1 system) to the secondary processors 12. The signals for the switching instructions are transferred through the system control buses 14-0 and 14-1 connected to the main processors 11. On the other hand, the system switching notification units 16-0 and 16-1 are also in the main processors 11-0 and 11-1 and notify the secondary processors 12 that a system switching instruction has already been sent from the system switching instruction units 15-0 and 15-1. It should be understood that the 1 system communication bus 13-1 and the 1 system control bus 14-1 are not illustrated specifically for simplification, but these buses are in parallel with the 0 system communication bus 13-0 and the 0 system control bus 14-0, respectively, as shown in FIG. 1.

Assume now that the 0 system is the active system. For some reason, (for example, a fault), the main processor 11-0 performs switching of the system. Thereby, the 1 system main processor 11-1 subsequently operates as the active system. Therefore, due to the above preconditions, the 1 system secondary processors 12-11 to 12-1k and the 1 system buses 13-1 and 14-1 become the above system. At this time, the system switching instruction unit 15-0 sends a system switching instruction signal to the corresponding 0 system secondary processors 12-01 to 12-0k and the system switching instruction unit 15-1 sends a system switching instruction signal to the corresponding 1 system secondary processor 12-11 to 12-1k. Next, the 0 system processors (12-01 to 12-0k), display that they should become the standby system. Conversely, the 1 system processors (12-11 to 12-1k), display that they should become the active system. These displays are made by the 0 system, system-switching display units 17-01 to 17-0k and the 1 system, system-switching display units 17-11 to 17-1k in FIG. 2. However, these display units need not be newly provided because use may be made of existing flag registers or status registers.

Therefore, a system switching instruction is sent from the main processor 11 side to the secondary processor 12 side. The secondary processors 12, however, cannot immediately detect that their own statuses have been changed. Therefore, the active system and standby system on the main processor 11 side and the active system and standby system on the secondary processor 12 side invert, leading to serious system errors. Generally, the switching instruction cannot be immediately detected because the system switching display (17), includes the above-mentioned flag or status registers, is not looked at while the secondary processors 12 are on-line. They are looked upon at most when the power is turned on or upon IPL (initial program loading).

Therefore, it is arranged so that the system switching notification units 16-0 and 16-1 notify without delay the 0 system and 1 system secondary processors 12-01 to 12-0k and 12-11 to 12-1k that system switching has occurred and prompt the processors to look at their internal switching display units (17). At this point, the active system and standby system of the main processor 11 side coincide with the active system and standby system of the secondary processor 12 side.

Figure 3A:
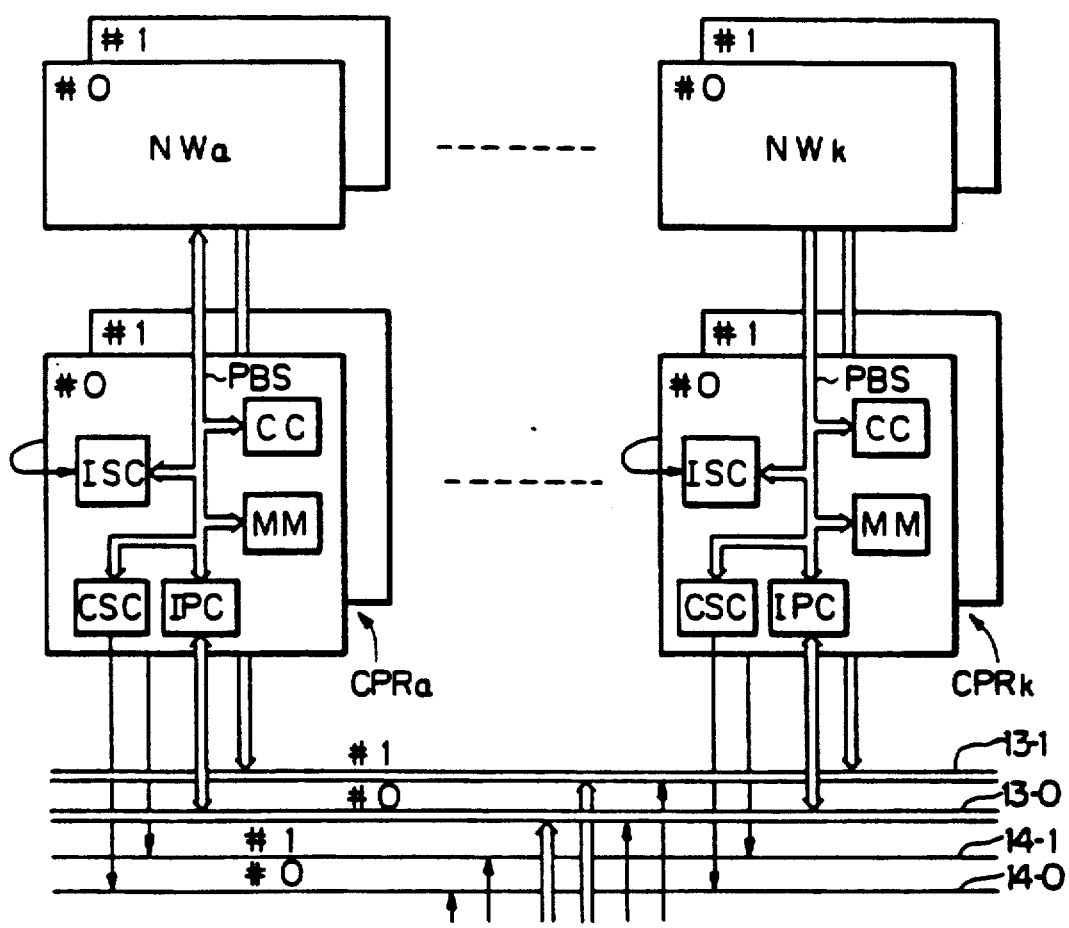
FIG. 3A shows an example of the components of the system to which the present invention is applied on the secondary processor side.
Figure 3B:
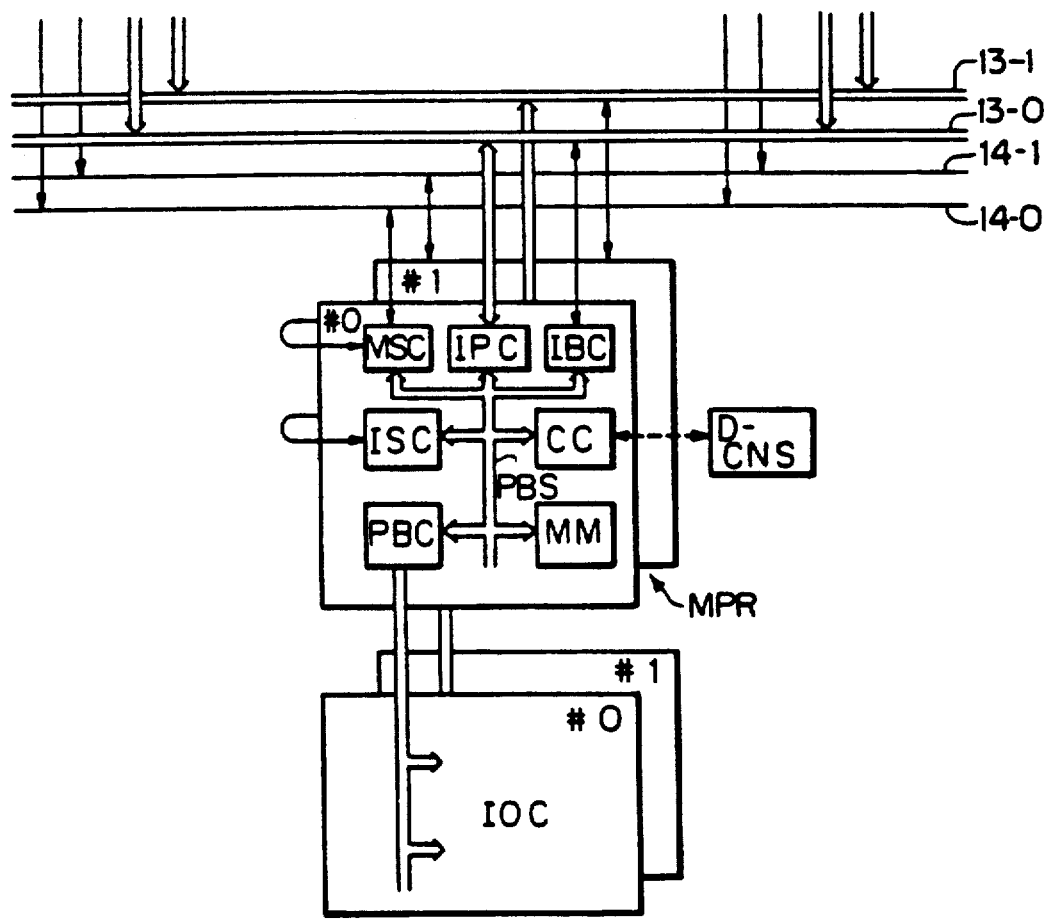
FIG. 3B shows an example of the components of the system to which the present invention is applied on the main processor side.

FIG. 3A shows an example of the components of the system to which the present invention is applied on the secondary processor 12 side. FIG. 3B shows an example of the components of the system to which the present invention is applied on the main processor 11 side. Particularly important constituent elements of the present invention lie in the blocks shown by CC and CSC in FIG. 3A and in the blocks shown by CC, MSC, and ISC in FIG. 3B (discussed in detail later). Note that the following explanation is made in reference to the example of an electronic switching system, but the above main processors 11 are specifically management processors and the above secondary processors 12 are specifically call processors. In the figures, the former are illustrated as MPR (management processors) and the latter by CPR (call processors). In FIG. 3A, the call processors $CPR_a$ to $CPR_k$ control the corresponding networks $NW_a$ to $NW_k$. The networks include speech path memories and other switching system functional units and set a path route. The existence of a plurality of networks $NW_a$ to $NW_k$ is based on the so-called "load dispersion" rationale. For this, a plurality of call processors $CPR_a$ to $CPR_k$ are provided corresponding to the networks.

Further, to improve the reliability of communication, the networks are duplexed and thus include 0 system (#0) and 1 system (#1) pairs. The 0 system call processor (CPR) group communicates through the communication bus 13-0 with the 0 system management processor $MPR_0$. In accordance with need, the 0 system call processors ($CPR_{a0}$ to $CPR_{k0}$) can also communicate with each other through the communication bus 13-0. In the same way, the active system, i.e., the 1 system call processor (CPR) group communicates through the communication bus 13-1 with the 1 system management processor $MPR_1$ and, in accordance with need, the 1 system call processors ($CPR_{a1}$ to $CPR_{k1}$) communicate with each other through the communication bus 13-1. It is assumed here that in any one of the processors CPR, communication between CPR's within a system is performed (#0⇌#1), but communication between systems with other CPR's is not performed. This is for simplification of the hardware and simplification of the software management.

Next, an explanation will be made of the internal construction of the call processors CPR. All of the call processors CPR have the same construction, so the explanation will be made of $CPR_a$ as a typical example. The 0 system and 1 system of the call processor $CPR_a$ are comprised of CC, ISC, CSC, IPC, and MM. The names of these parts are shown below:

(1) CC: Central controller
(2) ISC: Interface subsystem controller
(3) CSC: Call processor side system reconfiguration controller
(4) IPC: Inter multiprocessor communicator
(5) MM: Main memory
(6) PBS: Processor bus Among the above (1) to (6), (1), (5), and (6) are general elements, while (2), (3), and (4) are elements unique to the multiprocessor system. First, looking at the interface subsystem controller ISC, the controller interfaces between the 0 system and 1 system. In preparation for system switching, the controller supplies to the standby system the data of particular importance contained in the latest data of the active system. When system switching occurs, it functions so that the standby system can be set up quickly.

The call processor CPR side system reconfiguration controller CSC is on the call processor side (there is also one on the management process MPR side) and transfers control information for control of reconfiguration through the system control bus (14) when there are faults making system reconfiguration impossible, upon power on, etc. on the normal communication route in the multiprocessor system.

The inter multiprocessor communicator IPC is a control device for performing data communication operations on the communication bus (13) from the CPR's to an MPR, from an MPR to the CPR's, or among CPR's of the same system. That is, data communication for the usual call processing is performed through this communicator IPC.

Next, an explanation will be made of the internal construction of a management processor MPR in reference to FIG. 3B. However, no repetition will be made of the explanation of blocks the same as those explained with reference to FIG. 3A. Note that the buses 13-0, 13-1, 14-0, and 14-1 of FIG. 3B are completely the same as the buses 13-0, 13-1, 14-0, and 14-1 of FIG. 3A. The blocks unique to FIG. 3B are as follows:

(1) MSC: Management processor side system reconfiguration controller
(2) IBC: Inter multiprocessor bus controller
(3) PBC: Peripheral bus controller The above-mentioned management processor side system reconfiguration controller MSC is placed on the management processor side and functions the same as the call processor side CSC.

The inter multiprocessor bus controller IBC controls the right to use of the communication bus (13) by the inter multiprocessor communicator IPC which, for example, performs polling. Further, the peripheral bus controller PBC controls the input-output controller IOC and functions as an adapter for the external memory devices (floppy disks etc.) under the IOC. Note that the block connected with the management processor MPR by the dotted line is a debug console D-CNS and is used only during software debugging.

Therefore, the plurality of call processors CPR of FIG. 3A and the management processors MPR are used to control the plurality of networks $NW_a$ to $NW_k$. In such a system, the present invention relates to how the system switching is performed. For example, when there is a fault in a CPR in the active system, i.e., 0 system (#0), control is passed to the active system, i.e., the 1 system (#1), by the designated procedure.

Figure 4:
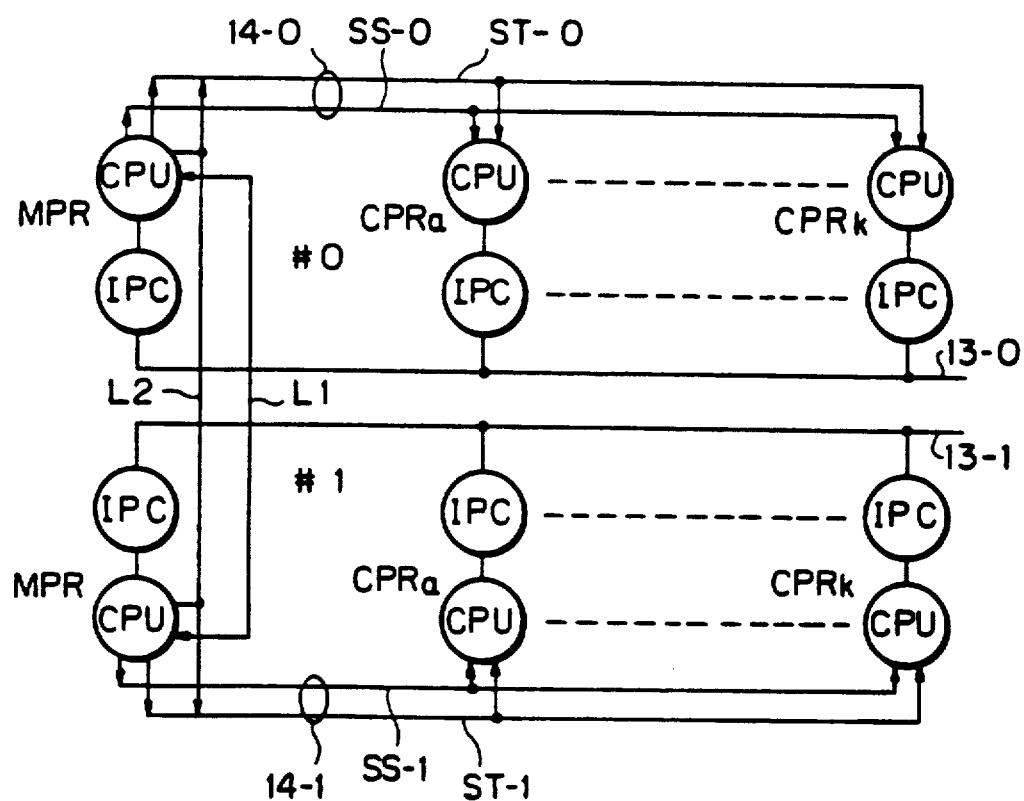
FIG. 4 shows schematically the method of system switching of the present invention according to a first embodiment.

FIG. 4 shows schematically the method of system switching of the present invention according to the first embodiment. In the figure, the portion above the communication buses 13-0 and 13-1 is the 0 system and the portion below is the 1 system, the two systems being shown separated. IPC are inter multiprocessor communicators, already explained with reference to FIGS. 3A and 3B, an IPC connecting the management processor MPR#0 and the call processors $CPR_a$ #0 to $CPR_k$#0 through the communication bus 13-0. Exactly the same construction applies to the 1 system as shown. In the figure, CPU is a central processing unit and a general name for the elements in the MPR's and CPR's, other than the IPC's, in FIGS. 3A and FIG. 3B (that is, CC, ISC, MM, etc.) and are grouped together for the sake of simplification of illustration. The CPU's of the 0 system are connected by the system control bus 14-0, while the CPU's of the 1 system are connected by the system control bus 14-1. With the system control buses 14, there are shown the system switching instruction signal lines SS (SS-0 and SS-1) and the system switching notification signal lines ST (ST-0 and ST-1), which are of particularly relevance to the present invention.

As a precondition of the present invention, it is considered that the instruction for system switching is given primarily by the management processor MPR. Therefore, system switching instruction signal lines SS are used and the system switching instruction performed uniformly for the call processors $CPR_a$ to $CPR_k$. In this case, the system switching instruction is given simultaneously not only to the system originating the system switching instruction, but also to the other system. Such intersystem liaison is performed through the line L1. Here, the system switching display units 17 of the CPR's (block referenced by 17 in FIG. 2) are given new system displays. That is, those previously displayed as the 1 system (0 system) are given a display to the effect that they are to be changed over to the 0 system (1 system).

Next, a system switching notification signal is sent from the management processor MPR side to the call processor CPR side. For this, system switching notification signal lines ST are used. Here, the CPR's are instructed to look at the corresponding system switching display units (17). Under this instruction, the CPR's operate as the new system. In this case, the switching notification is given simultaneously not only to the system originating the system switching instruction, but also to the other system, with the intersystem liaison being performed through the line L2, in a similar fashion to the above-mentioned system switching instruction.

Figure 5A:
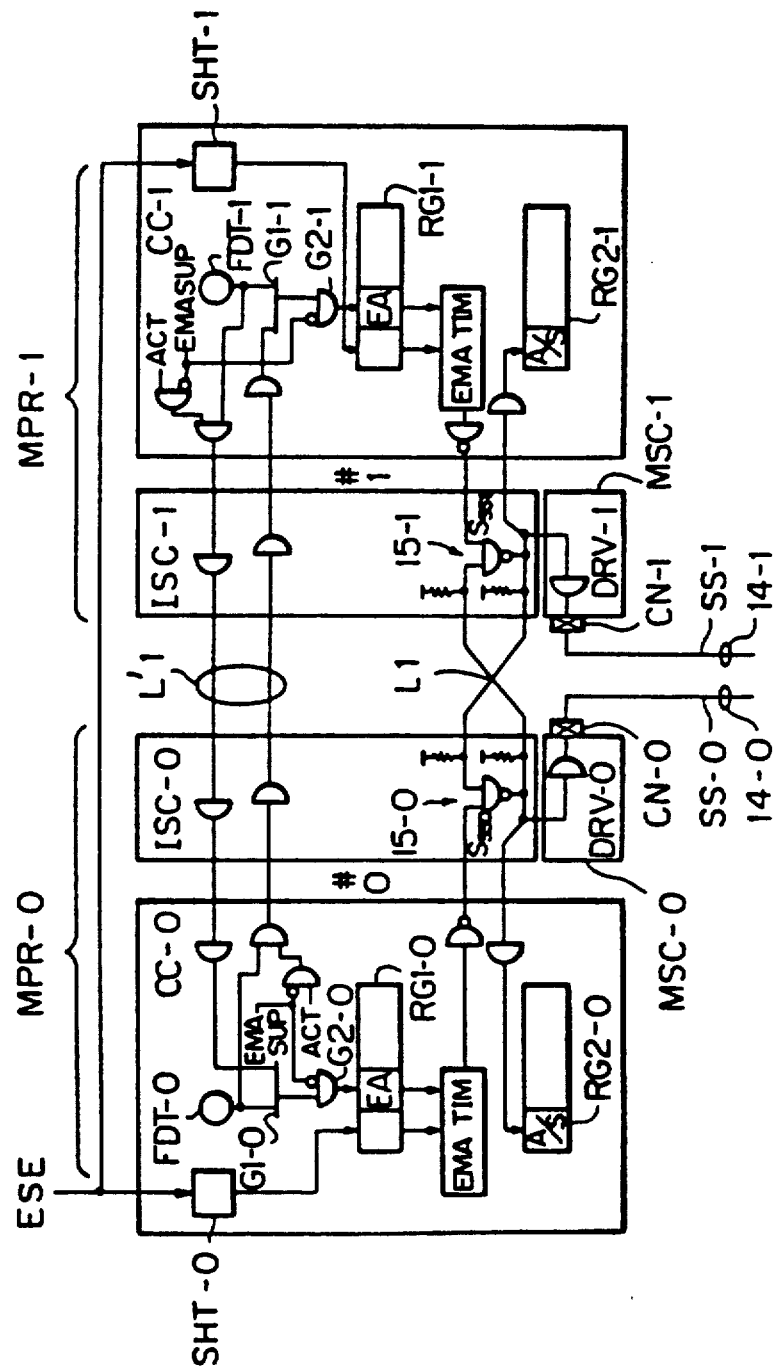
FIG. 5A shows specific examples of the system switching instruction units of the present invention for the management processor (i.e., MPR) side.
Figure 5B:
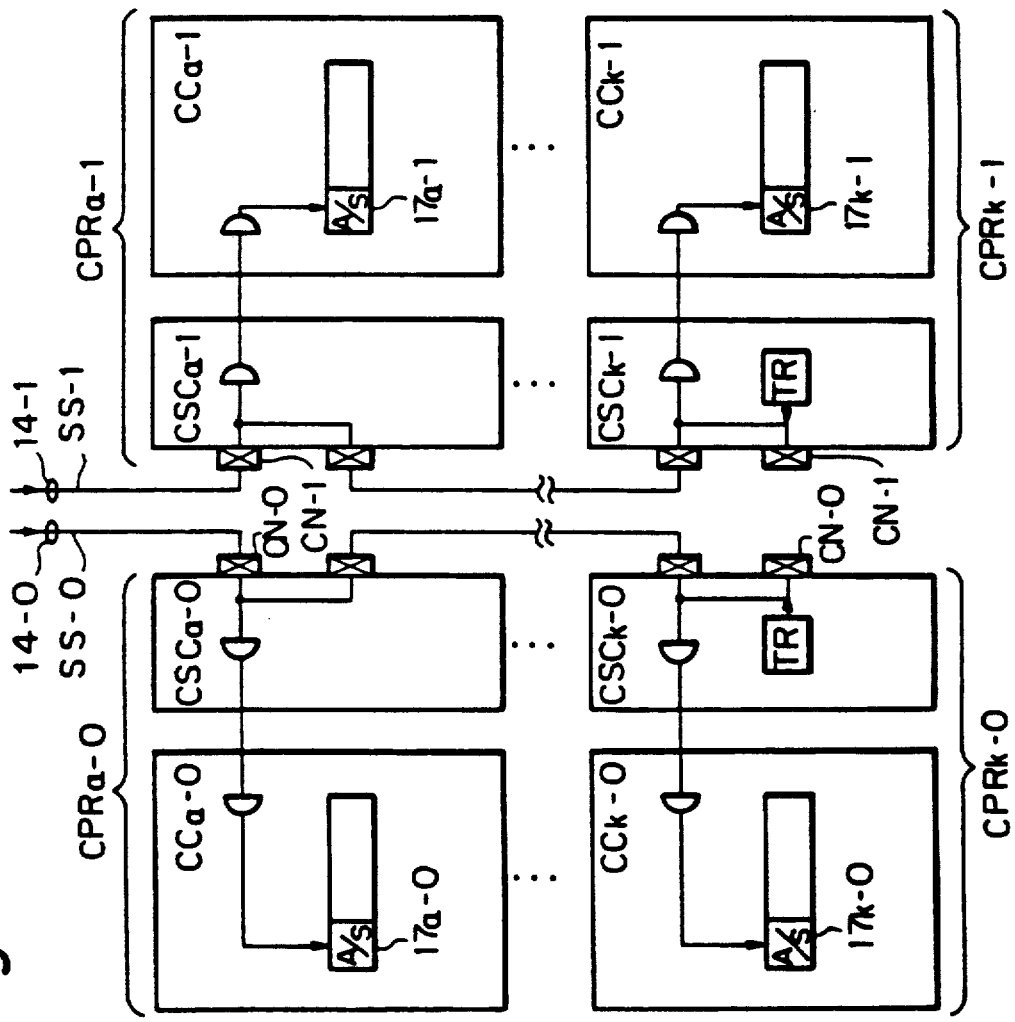
FIG. 5B shows examples of system switching display units of the call processor (i.e., CPR) side related with the system switching instruction units of the present invention.

FIG. 5A shows specific examples of the system switching instruction units 15 of the present invention for the MPR side. FIG. 5B shows examples of system switching display units 15 of the CPR side related to the system switching instruction units 15 of the present invention. The constituent elements of FIG. 5A and FIG. 5B are connected by the 0 system, system-switching instruction signal line SS-0 and the 1 system SS-1. In FIG. 5A, the side left of the center is the 0 system and right of the center is the 1 system. That is, the management processors MPR-0 and MPR-1 are arranged to the left and right. Their constituent central controllers CC-0 and CC-1, interface subsystem controllers ISC-0 and ISC-1, and system reconfiguration controllers MSC-0 and MSC-1 are shown. The system switching instruction units (15-0 and 15-1 in FIG. 2), which are characteristic features of the present invention, are shown as 15-0 and 15-1 in the interface subsystem controllers ISC-0 and ISC-1. A cross-connection line L1 is used to form a kind of latch circuit. L1 is equivalent to the line L1 shown in FIG. 4. This cross-connection makes it possible to ensure that if one side is the 0 system, the other side necessarily becomes the 1 system. The output logics instructing the 0 system and 1 system, for example, "0" and "1", are sent through the respective corresponding drivers DRV-0 and DRV-1 (or DRV-1 and DRV-0) to the system switching instruction signal lines SS-0 and SS-1 (or SS-1 and SS-0). The signal lines SS-0 and SS-1 are one of the system control buses 14-0 and 14-1, respectively. The buses 14-0 and 14-1 are connected by the connectors CN-0 and CN-1 to the MPR-0 and MPR-1.

The system switching instruction units 15-0 and 15-1 are driven, upon the detection of some fault, by the management processor MPR of the active system. Supposing that MPR-0 is the active system, an example of the events until the driving of the system switching instruction unit 15-0 is explained below. Note that the explanation will be only for the 0 system, since the same events apply equally as well in the case where the 1 system MPR-1 is the active system. Further, the system switching instruction unit 15-1 is driven automatically through the line L1 by the other system switching instruction unit 15-0. According to this example, first, the fault detection timer FDT-0 overflows. In general, the timer FDT is managed by software and is programmed so that the count is cleared every fixed period of time. That is, so long as no abnormalities arise, such as a runaway operation of the software, etc., the timer FDT will be cleared and thus will not overflow. If it overflows, this means that some sort of abnormality has arisen, so the overflow information is set through the gates G1-0 and G2-0 to the predetermined bit EA of the emergency register RG1-0. By this change of the bit EA, the 0 system, system-switching instruction unit 15-0 is driven through the emergency timing circuit EMATIM and from there a system switching instruction signal $S_{SS0}$ is output. The signal $S_{SS0}$ is sent to the system switching instruction signal line SS-0, as already explained. At the same time, the 1 system, system-switching instruction unit inverts in status. Further, the predetermined bit A/S in the mode register RG2-0 of the 0 system switches to S. A of the A/S bit means the active system (Standby) and S the standby system (Standby). Therefore, the A/S bit of the mode register RG2-1 in the 1 system is switched from S to A. Note that A/S are differentiated by merely the difference between the logic "1" or "0". Therefore, a switching instruction is sent from the management processor MPR-0 to the 0 system call processors $CPR_a$ to $CPR_k$. Further, switching is simultaneously proceeded with in the 1 system MPR-1, also by the switching information obtained from the line L1, and a switching instruction is sent to the 1 system call processors $CPR_a$ to $CPR_k$ as well. Note that the reasons for faults are not limited to the above. Many reasons exist and other reasons are notified mutually through the cross-connection line L'1. EMASUP in the figure is an "emergency-action suppress" signal. The factor ESE (emergency supervisor equipment), which is to be set simultaneously in the 0 system and 1 system, is set in a predetermined bit in the above-mentioned emergency register RG1, through the 0 system and 1 system one-shot circuits SHT-0 and SHT-1. However, the above-mentioned ESE, EMASUP, FDT, etc. are not the main point of the present invention and thus will not be explained in detail.

The system switching instruction signals $S_{SS0}$ and $S_{SS1}$ from the above system switching instruction units 15-0 and 15-1 are supplied to the call processor CPR side, so the explanation will be continued with reference to FIG. 5B. In FIG. 5B, the $CPR_{a-0}$ and $CPR_{a-1}$ are respectively the 0 system and 1 system call processors ($CPR_a$). The same applies for $CPR_k$. In the $CPR_{a-0}$, there are included the central controller $CC_{a-0}$ and system reconfiguration controller $CSC_{a-0}$. The same applies for the $CPR_{a-1}$, $CPR_{k-0}$, and $CPR_{k-1}$. Controllers in the same system are connected through the connectors (CN) in a series fashion (in the figure, TR is a terminal resistance). In the central controllers CC, there are previously established mode registers, predetermined bits A/S which include the afore-mentioned system switching display units 17 (in the figure, 17a-0, 17a-1 to 17k-0, 17k-1). The meaning of A/S (Act/Standby) was explained with reference to FIG. 5A. In the above example, the 0 system functioned as the active system, so the A/S bits of the system switching display units 17 of the 0 system and 1 system are, respectively, "0" and "1". If a fault is detected by the management processor MPR-0, the system switching instruction signals $S_{SS0}$ and $S_{SS1}$ become the logic "1" and "0", respectively, by the procedure explained with reference to FIG. 5A and are taken into the 0 system call processor CPR group and 1 system call processor CPR group to change the logic of the A/S bits. However, it is impossible with this alone for the call processors CPR to switch themselves to the other system (active→standby system, standby→active system). The reason being is that when the call processors CPR are on-line, they do not look at the mode registers. Therefore, the afore-mentioned system switching notification units 16-0 and 16-1 are activated. This will be explained below.

Figure 6A:
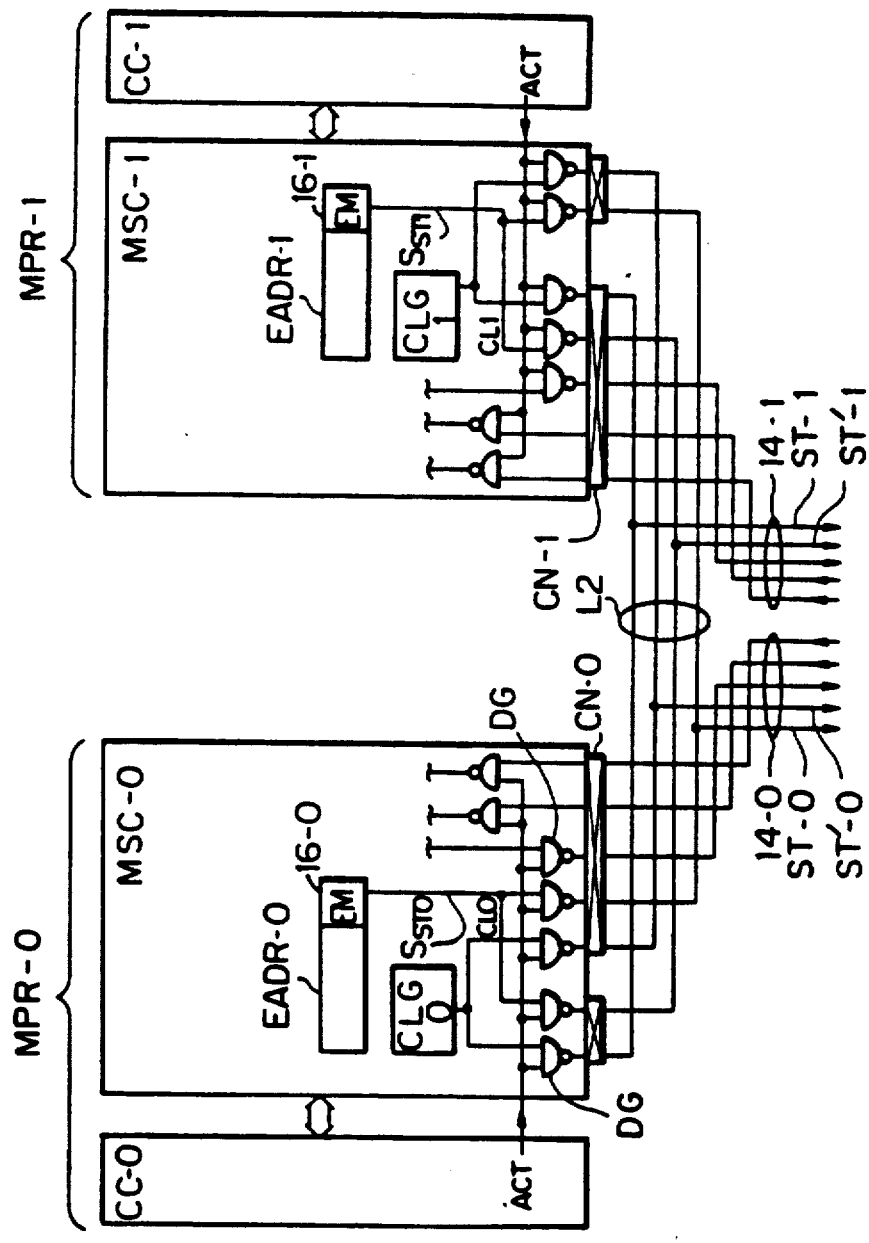
FIG. 6A shows examples of management processors provided with system switching notification units according to the present invention.
Figure 6B:
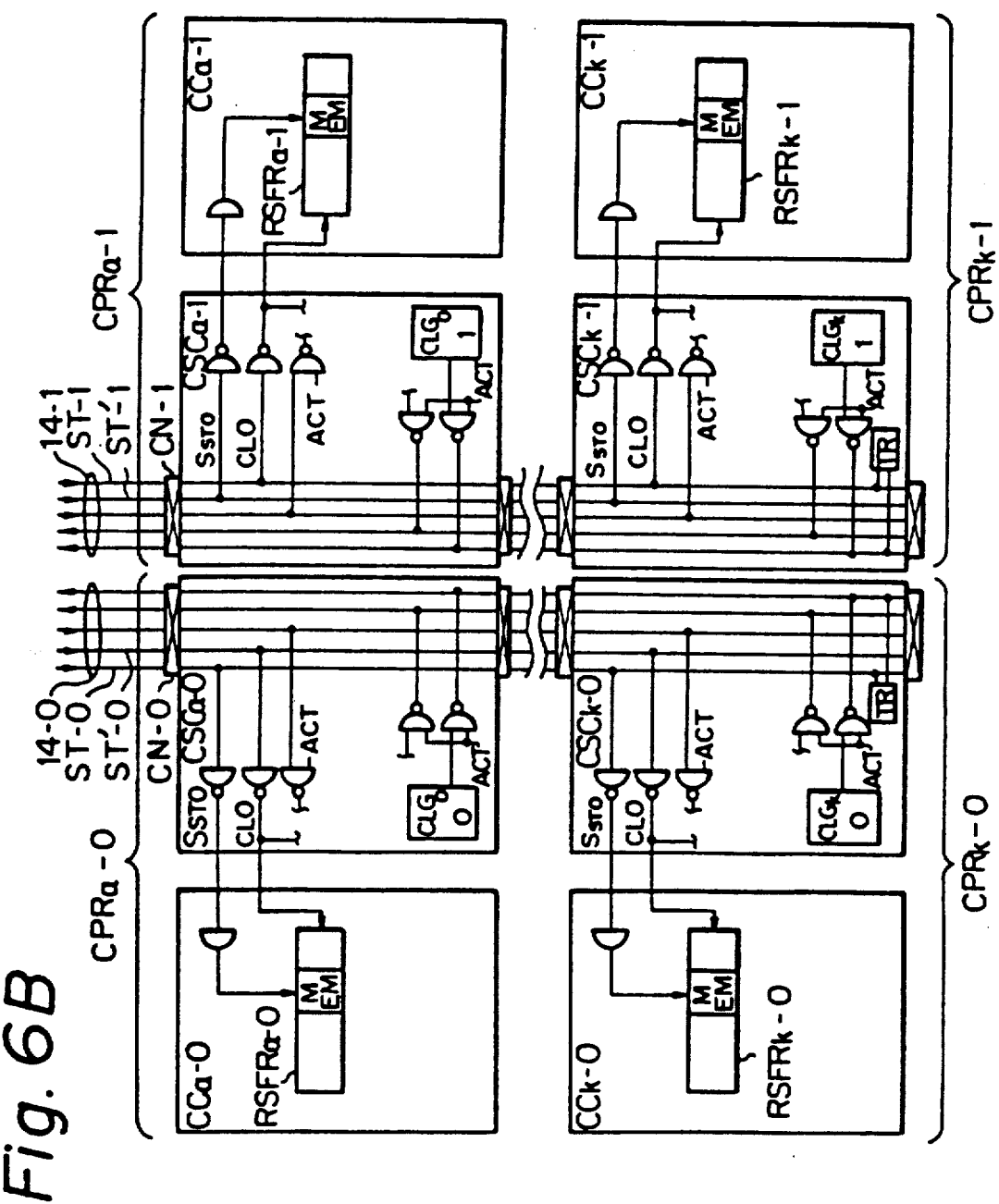
FIG. 6B shows examples of call processor groups activated by the system switching notification units of FIG. 6A.

FIG. 6A shows examples of management processors MPR provided with system switching notification units 16 according to the present invention. FIG. 6B shows examples of call processor CPR groups activated by the system switching notification units 16 of FIG. 6A. Constituent elements of FIG. 6A and FIG. 6B are connected by the 0 system, system-control bus 14-0 and the 1 system, system-control bus 14.1. Among these, the 0 system and 1 system, system-switching notification signal lines ST-0, ST-1 and ST'-1 are the respective synchronization signal transmission lines. Note that the line L2 in FIG. 4 corresponds to the line L2 for mutual connection in FIG. 6A. In this figure, the system switching notification units 16-0 and 16-1 of the present invention are in the management processor MPR side system reconfiguration controllers MSC-0 and MSC-1 and specifically are realized as EM bits in the emergency action designation registers EADR-0 and EADR-1. When "1" stands in an EM bit, it means that an abnormality has occurred. Note that writing into an EM bit is performed by software processing. This "1" of an EM bit is sent as the system switching notification signal $S_{ST0}$ (if the 1 system, $S_{ST1}$) through the driver gate DG to the system switching notification signal line ST-0. At this time, the EM bit "1" is supplied through the line L2 to the opposing system (1 system). In the 1 system as well, notification of the occurrence of system switching is received through the system switching notification signal line ST-1.

In actuality, not only is the system switching notification signal (EM bit, $S_{ST0}$, $S_{ST1}$) required, but also a synchronization clock signal must be sent. This clock signal is sent as the synchronization signal CL0, whereby synchronization is established among the system reconfiguration controllers $CSC_{a-0}$, $CSC_{a-1}$ to $CSC_{k-0}$, and $CSC_{k-1}$ which receive said system switching notification signal $S_{ST0}$ $S_{ST1}$. Note that if the 1 system is the active system, the synchronization signal CL1 is used. In either case, the signals are generated by the synchronization signal generation circuits CLG-0 and CLG-1 and transmitted by the synchronization signal transmission lines ST'-0 and ST'-1 to the call processor CPR side. On the call processor CPR side of FIG. 6B, the system switching notification signals $S_{ST0}$, $S_{ST1}$ and the synchronization signal CL0 (CL1)) are received at the system reconfiguration controllers $CSC_{a'}$-0, $CSC_{a'}$-1 to $CSC_{k'}$-0, and $CSC_{k'}$-1, respectively. If the 1 system had been the active system up to then, $S_{ST1}$ and CL1 would be received by the CSC's of the two systems. These signals preferably set predetermined bits MEM (management processor emergency), in the existing restart flag registers (RSFR-0 and RSFR-1) in the central controllers (CC) to "1" at a predetermined timing. This timing is defined by the afore-mentioned synchronization signal CL0.

Notification of system switching in this way to the CPR's through the restart flag registers (RSFR) is extremely effective. The reason for this is that the restart flag are for instructing interruption of highest priority, so the software in the call processors (CPR) immediately looks at the predetermined bits. At that point in time, the system switching display units (17) of FIG. 5B, that is, the A/S bits, are looked at and processing is started for switching to the other system, whereupon the active system is switched to the standby system and the standby system to the active system. At this point, it is realized that everything in the 0 system is to be switched to the standby system and everything in the 1 system is to be switched to the active system.

Several examples of the operation achieved in the first embodiment will be given.

(1) Power-on IPL (initial program load)
(2) Fault in MPR: PH1
(3) Fault in IPC in MPR at IPL: PH2
(4) Fault in IPC in CPR at IPL: PH2
(5) ESE emergency: PH1

The meanings of the above symbols, other than PH1 and PH2, have already been explained. PH means "phase". It is usually divided into 0, 1, and 2, the higher the number, the higher the degree of fault. That is, PH2 indicates the highest level and requires of the highest priority.

In an electronic switching system, in the PH2 set-up mode, the exchange processing itself cannot be maintained. In PH1, there is a sudden switching despite the system being on-line, but current communication can be saved while dialing is cut off. In PH0 switching, current communication can be saved and dialing can be saved, so the conversing parties will hardly notice anything in this set-up mode.

Figure 7A:
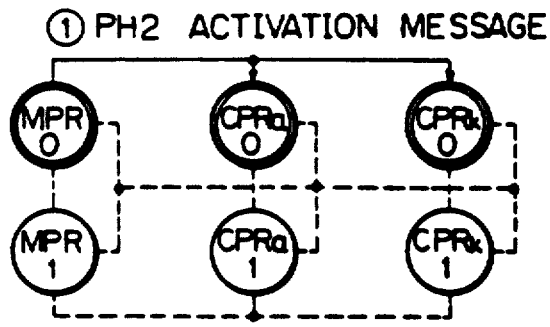
FIGS. 7A to 7D show the system transition in the case of power-on initial process loading IPL.
Figure 7B:
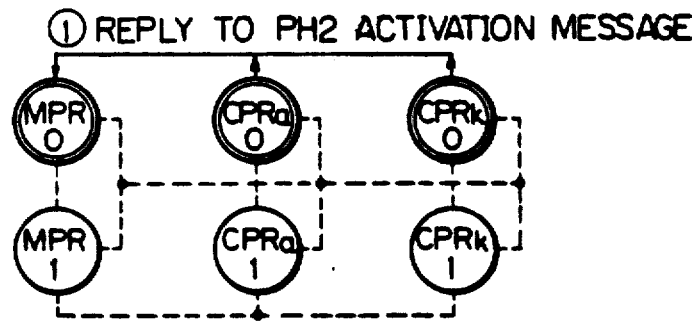
Figure 7C:
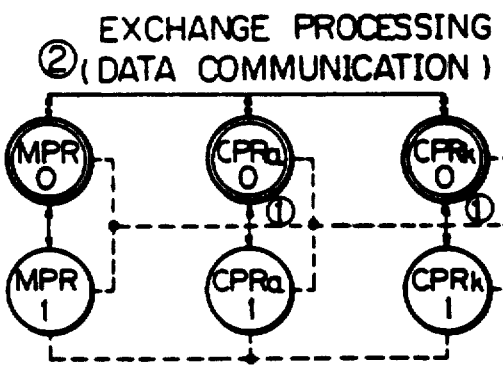
Figure 7D:
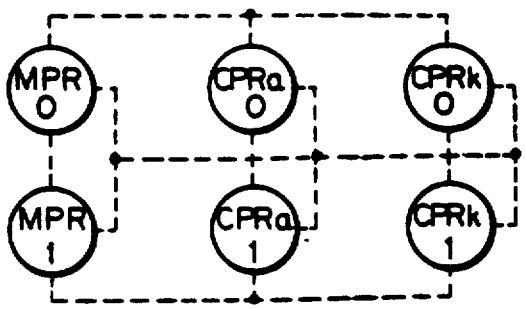

FIGS. 7A to 7D show the system transition in the case of power-on IPL. The order of transition is, from the top, 7A→7B→7C=7D. The transition charts are drawn according to the system construction of FIG. 4. In the lines connecting the MPR's and CPR's, no special operation occurs on the dotted line portions; action occurs only on the solid line portions. The same is true for the following FIGS. 8 to 11. The solid line in FIG. 7A is a PH2 activation message, which PH2 activation message is sent from an MPR to all the CPR's. The solid line in FIG. 7B is a reply to the PH2 activation message, this reply to the PH2 activation message is received by the MPR from all the CPR's, whereby initial program loading IPL of the CPR's occurs and restart processing performed. In FIG. 7C, ① indicates intersystem data communication and ② exchange processing (data communication). At ①, an MPR begins an MM copy operation from all the CPR's of the ACT (active) system to the SBY (standby) system. At ②, in parallel with this copy operation, the system enters exchange processing (on-line processing) in a parallel mode.

Figure 8A:
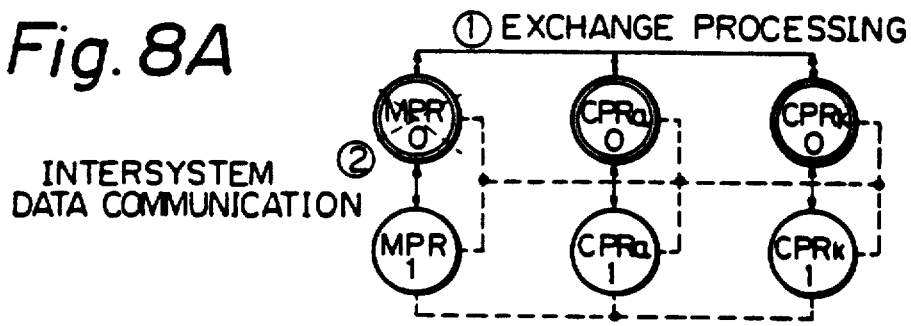
FIGS. 8A to 8D show the system transition in the case of management processor MPR fault.
Figure 8B:
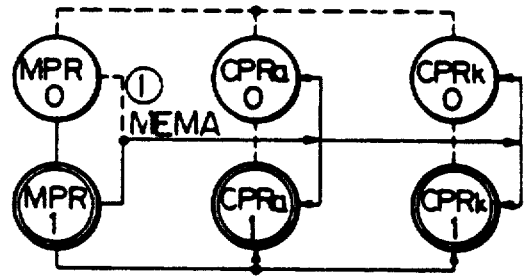
Figure 8C:
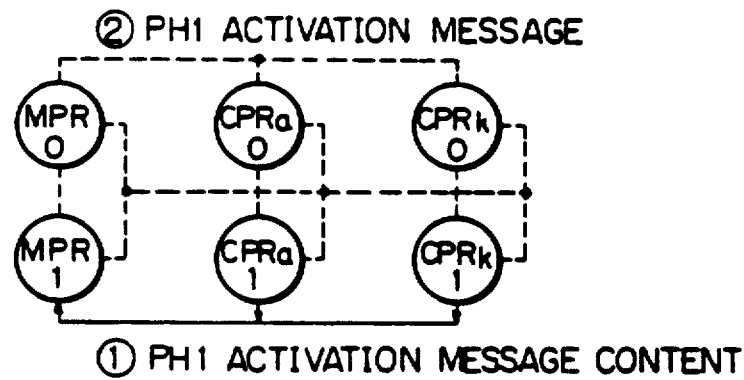
Figure 8D:
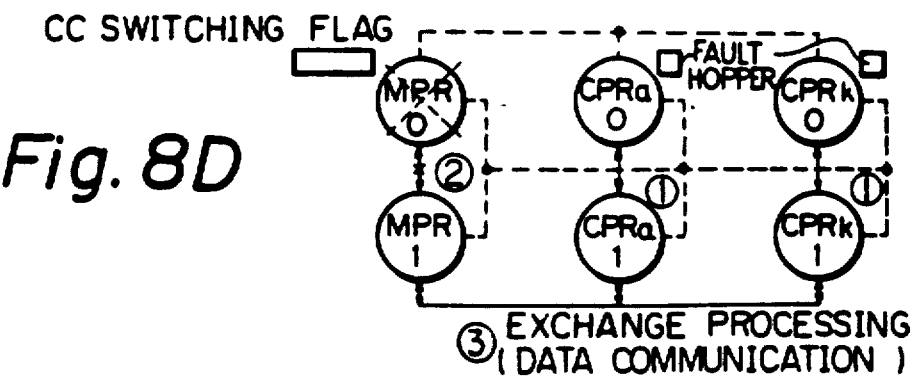

FIGS. 8A to 8D show the system transition in the case of an MPR fault. In FIG. 8A, ① indicates exchange processing and ② intersystem data communication. The multiprocessor system is in normal operation (one-line), but the A/S (ACT/SBY) bit is rewritten by the emergency circuit. In FIG. 8B, ① indicates an MPR side emergency (MEMA) and ② a PH1 activation message. At ①, the occurrence of a fault in an MPR is notified from the MPR to all the CPR's. At ②, a PH1 activation message is sent from the MPR to all the CPR's. The solid line in FIG. 8C is a reply to PH1 activation message, the reply to PH1 activation message reply being received by the MPR from all the CPR's, whereby restart processing is performed at the system PH1. In FIG. 8D, at ①, a CPR's read the fault hopper of the old ACT system at the end of the PH1 restart processing and, when there is nothing written there, perform the above copy operation. At ②, the MPR reads the CC switching flag of the old ACT system at the end of the PH1 restart processing and, when there is nothing written there, goes down alone. Note that ③ indicates exchange processing (data communication).

Figure 9A:
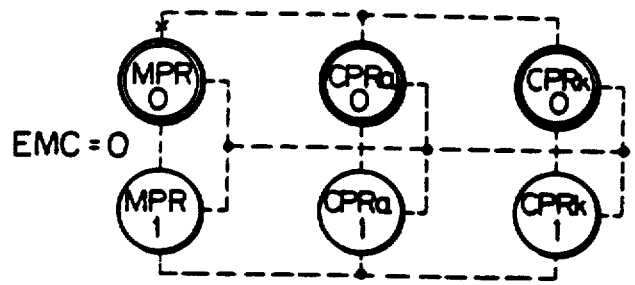
FIGS. 9A to 9D show the system transition in the case of an IPC fault in an MPR at IPL.
Figure 9B:
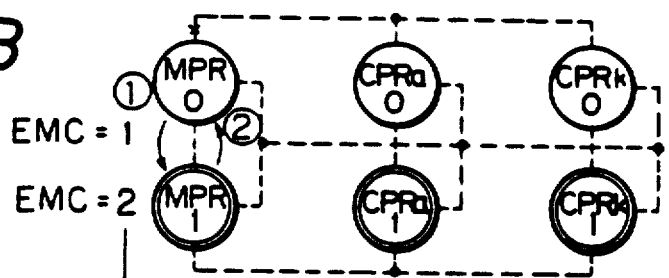
Figure 9C:
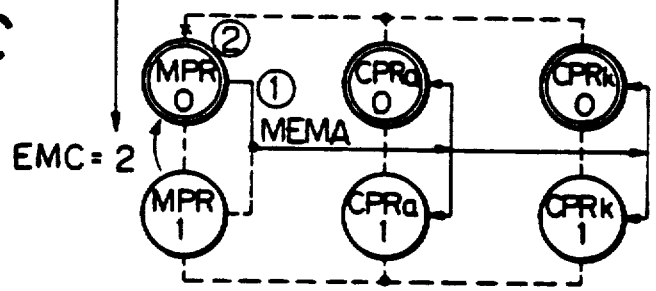
Figure 9D:
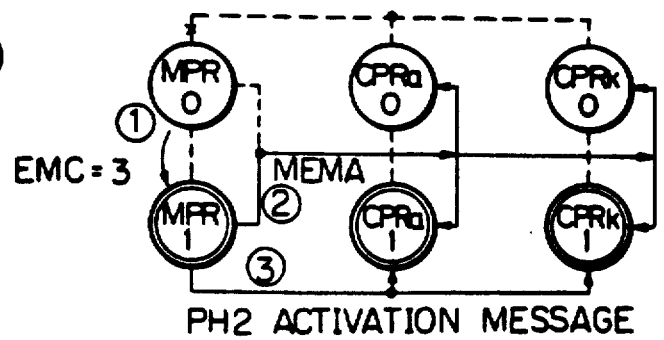

FIGS. 9A to 9D show the system transition in the case of an IPC fault in an MPR at IPL. In FIG. 9A, a PH2 activation message is sent from the MPR to all the CPR's. Note that EMC indicates an emergency counter which counts the number of occurrences of emergencies. In FIG. 9B, at ①, the MPR emergency circuit is activated by the absence of a PH2 activation message reply from all the CPR's. At ②, execution of the system PH1 is attempted (by MPR), but since no program is loaded, the software runs wild and, as a result, the FDT again overflows. In FIG. 9C, ① indicates an MPR side emergency MEMA, wherein the IPC fault in the MPR under IPL is notified from the MPR to all the CPR's. At ②, a PH2 activation message is sent from the MPR to all the CPR's. In FIG. 9D, at ①, the MPR emergency circuit is activated by the absence of a PH2 activation message reply from all the CPR's. ② indicates a MPR side emergency MEMA, wherein an IPC fault in the MPR is notified from the MPR to all the CPR's. At ③, a PH2 activation message is sent from the MPR to all the CPR's. At ④, the same process is performed at the power-on IPL shown in FIG. 7.

Figure 10A:
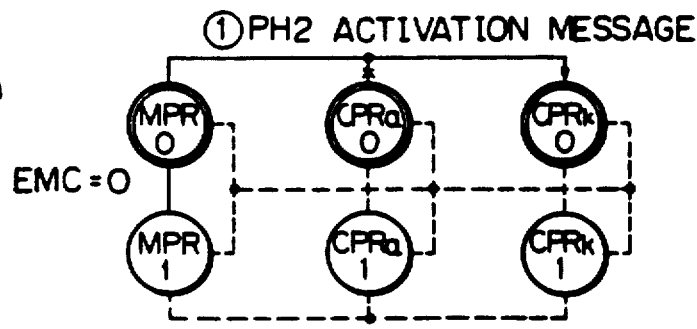
FIGS. 10A to 10D show the system transition in the case of an IPC fault in a CPR in IPL.
Figure 10B:
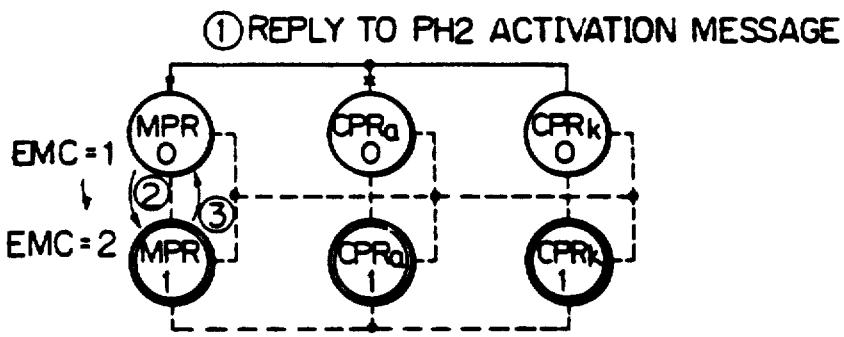
Figure 10C:
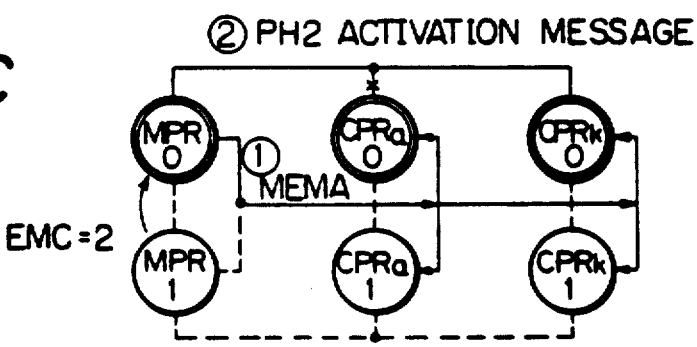
Figure 10D:
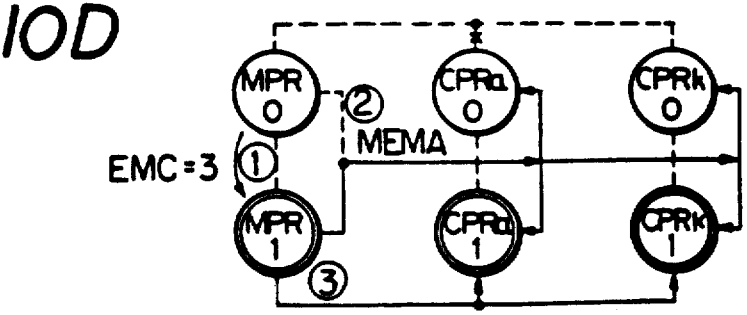

FIGS. 10A to 10D show the system transition in the case of an IPC fault in a CPR under IPL. The solid line in FIG. 10A is a PH2 activation message, the PH2 activation message being sent by an MPR to all the CPR's. In FIG. 10B, at ①, the MPR receives the PH2 activation message reply from all the CPR's. At ②, as receipt of communication from the CPR$_a$ is impossible, the emergency circuit is activated (FDT is made to overflow). At ③, the MPR tries to execute the system PH1, but since no program is loaded, the software runs wild and the FDT overflows. In FIG. 10C, ① indicates an MPR side emergency MEMA, wherein the IPC fault in the CPR under IPL is notified from the MPR to all the CPR's. At ②, a PH2 activation message is sent from the MPR to all the CPR's. In FIG. 10D, at ①, the MPR emergency circuit is activated by the absence of a PH2 activation message reply from all the CPR's. ② indicates a MPR side emergency MEMA, wherein an IPC fault in the CPR is notified from the MPR to all the CPR's. At ③, a PH2 activation message is sent from the MPR to all the CPR's. Thereafter, at ④, the same process is performed at the power-on IPL shown in FIG. 7.

Figure 11A:
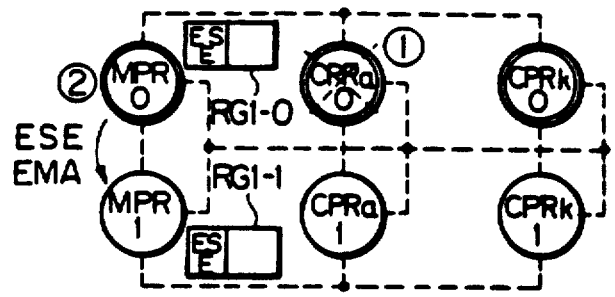
FIGS. 11A to 11D show the system transition in the event of an emergency supervisor equipment emergency.
Figure 11B:
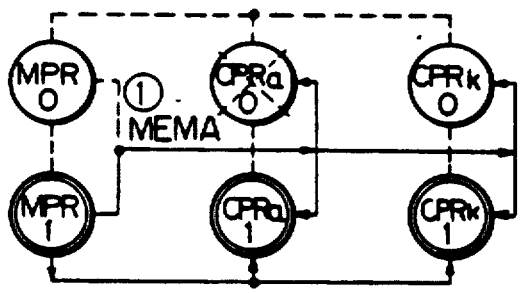
Figure 11C:
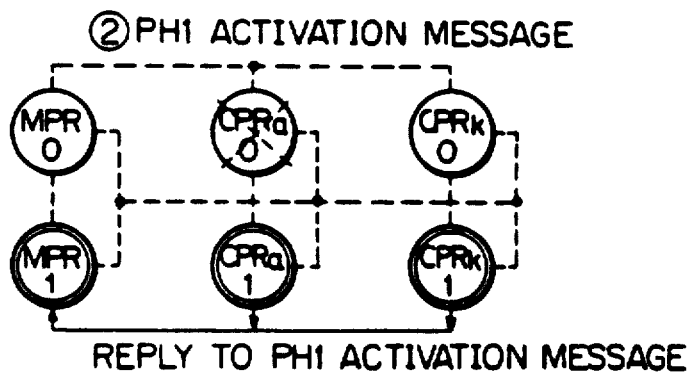
Figure 11D:
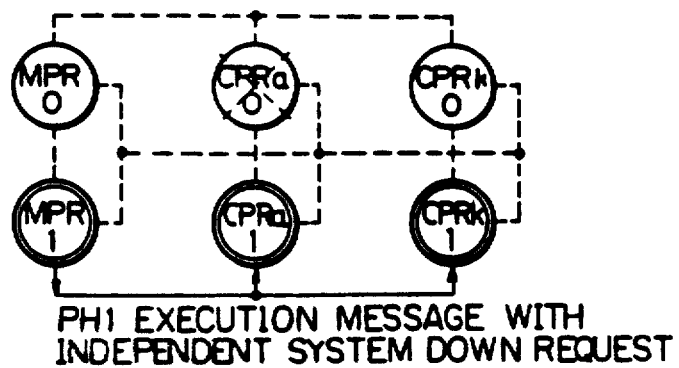

FIGS. 11A to 11D show the system transition in the event of an ESE emergency. In FIG. 11A, ① indicates the occurrence of an ESE emergency (EMA). At ②, the MPR emergency circuit is activated, the ESE bit of the MPR emergency register RG turns ON, and a restart is issued. At the same time as the restart, A/S switching is performed and thus an ESE emergency (EMA) is issued. Therefore, the ESE bits of the two systems turn ON. In FIG. 11B, ① indicates an MPR side emergency, wherein the occurrence of an ESE emergency in the CPR$_a$ is notified from the MPR to all the CPR's. At ②, a PH1 execution message is sent by the MPR to all the CPR's. The solid line in FIG. 11C is a reply to a PH1 execution message and PH2 is an execution message reply which is received by the MPR from all the CPR's. The solid line in the system of FIG. 11D is a PH1 execution message with an independent down request. First, the ESE bit of the MPR register RG is looked at and the occurrence of ESE, EMA discerned. Next, the PH1 execution message with the independent system down request is sent to all the CPR's. Finally, the MPR and all the CPR's assume system down independently.

As explained in detail above, according to the first embodiment of the present invention respective duplexed multiprocessors can execute switching from the 0 system to 1 system or vice versa without the software management becoming complicated and without the introduction of complicated hardware. Use for an electronic switching system results in much greater effectiveness of the system.

The reasons for a system switching are, as mentioned previously, principally faults, but include other factors as well. For example, there are periodic switchings. "Periodic switchings" are system processings for ensuring the stability of the standby system, wherein every fixed period of time (for example, at night), the active system and standby system are compulsorily switched to actively discover potential faults. In this case, system switching is requested even though there is no actual fault. In such system switching, an extremely large amount of data has to be transferred from the active system to the standby system and thus the problem of a long time being required is present. Further, even if the instruction for system switching is sent from the main processors 11 to the secondary processors 12, it takes time for the editing of the data of the instruction and the decoding on the receiving side, therefore the resolution of these problems has become increasingly difficult. The same thing applies in the case of transfer of control information from the secondary processors 12 to the main processors 11. If the system switching request from the secondary processors 12 to the main processors 11 is control information, it takes a considerable amount of time for that control information to be understood at the main processors 11. If the system switching form the secondary processors 12 derives from a serious fault, there is the problem that the time lag will cause a major fault in the system. This problem can be overcome by a second embodiment of the present invention, which will be explained in detail below.

Figure 12:
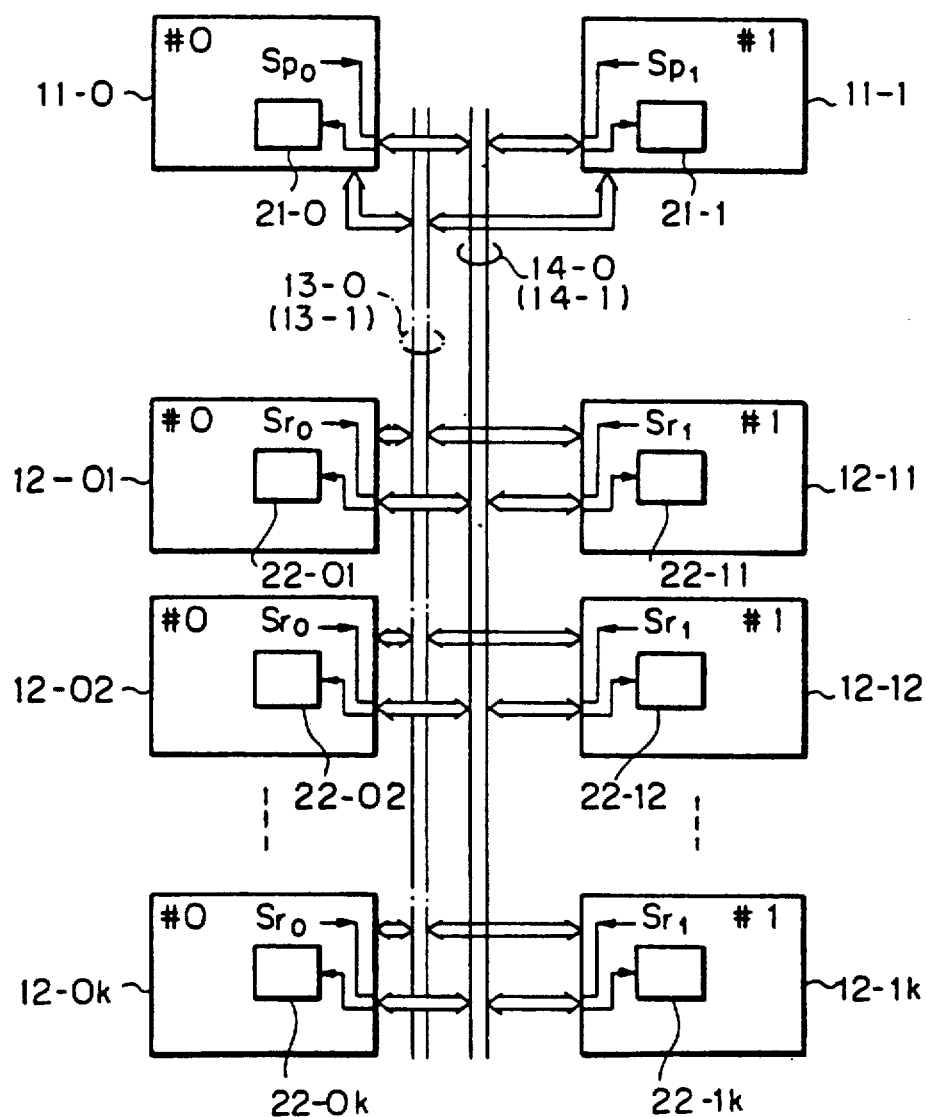
FIG. 12 is an explanatory view of the multiprocessor system according to a second embodiment of the present invention.

FIG. 12 is an explanatory view of the multiprocessor system according to a second embodiment of the present invention. In the second embodiment, major members are identical to those recited in the afore-mentioned first embodiment. That is, 11-0 is the 0 system main processor and 11-1 the 1 system main processor, each governing and managing a plurality of 0 system secondary processors 12-01 to 12-0k and a plurality of 1 system secondary processors 12-11 to 12-1k, respectively. Among these processors are connected 0 system and 1 system communication buses 13-0 and 13-1 for principally receiving data (for simplification, the 1 system communication bus 13-1 is not shown, but is in parallel with the 0 system communication bus 13-1). Further, among these processors are 0 system and 1 system control buses 14-0 and 14-1 principally for the transmission of control signals (for simplification, the 0 system control bus 14-0 alone is shown, but the 1 system control bus 14-1 is in parallel with 14-0). Here, constraint is applied, as in the first embodiment, so that all the processors of the 0 system and all the buses of the 0 system only receive data and control signals in the 0 system and all the processors of the 1 system and all the buses of the 1 system only receive data and control signals in the 1 system. This is a common precondition of the present invention. In other words, communication is only possible among elements of the same system. By constraining communication to be only among elements of the same system in this way, the amount of hardware can be considerably reduced and the software management can be made considerably easier. Another precondition is that the secondary processors (12) not be given system switching rights. In principle, the main processors (11) exercise system switching rights. This enables the software management to be made considerably easier.

Based on the above, in a multiprocessor system constituted in the second embodiment, a prediction signal Sp0 (Sp1 in the case of the 1 system being the active system) is sent from the main processor (11) side to predict to the secondary processors 12 that system switching is going to be executed in the future. The prediction signal Sp0 is received via the system control bus 14-0 and held in the 0 system, second holding units 22-01 to 22-0k in the secondary processors 12-01 to 12-0k.

On the other hand, a request signal Sr0 is sent from one of the secondary processors 12-01 to 12-0k to the main processor 11-0 for execution of system switching between the active system and standby system. This signal is sent from the secondary process 12 which recognizes that a fault has occurred therein and indicates communication is impossible. The same applies for the 1 system. A request signal Sr1 is sent from the 1 system secondary processor with a fault through the system control bus 14-1 to the main processor 11-1.

Assume now that the 0 system is the active system. For some reason, for example, due to the afore-mentioned periodic switching, the main process 11-0 schedules switching of the system to 11-1. This is predictable since it is a switching defined in the software. Therefore, the secondary processors 12 of the two systems are given a prediction to the effect that there will be system switching. This is the prediction signal Sp. This enables system switching work, principally the transfer of data to the 1 system, to begin before the periodic switching instruction is sent to the secondary processors 12 and thus enables the periodic switching to be made in an extremely short time. In this case, the secondary processors 12 supervise periodically the second holding units (22) therein ("look-in") to read the instruction status ("status read").

On the other hand, the processor system engages in system switchings, fundamentally, with the main processors (11), so faults in the secondary processors 12 would not allow the secondary processors 12 to change over the system as a whole without the main processor 11. Therefore, the secondary processors (12) are made to send request signals Sr for system switching to the main processors (11) and thus the main processors 11-0 and 11-1 are provided with a 0 system first holding unit 21-0 and a 1 system first holding unit 21-1 the same as the above second holding unit (22) so as to hold the request signals Sr. In this case, the main processors 11-0 and 11-1 periodically supervise their internal first holding units 21-0 and 21-1 ("look-in") to read their instruction statuses ("status read"). System switching is started speedily with just the simple transfer of a signal Sr. Note that it is not known at the main processor from which secondary process 12 the request signal Sr was issued. However, in system switching, no matter where the fault, the result is the same, i.e. a fault has occurred. Therefore, first, the system is switched, then subsequently, and slowly, the appropriate secondary processor 12 can be determined by periodic tests etc. Note that it is not necessary to provide new first and second holding units (21, 22), because use can be made of existing flag registers or status registers.

Comparing FIG. 12 (second embodiment) with FIG. 1 (basic structure), the first means 1-0 and 1-1 (FIG. 1) for achieving system switching control corresponds to the 0 system and 1 system, first holding units 21-0 and 21-1, respectively. The second means 2-0 and 2-1 (FIG. 1) for executing system switching correspond to the 0 system and 1 system, second holding units 22-0 and 22-1.

For a detailed example of the elements on the secondary processor 12 side of the second embodiment, see FIG. 3A, relating to the first embodiment. For a detailed example of the elements on the main processor 11 of the second embodiment, see FIG. 3B, relating to the first embodiment.

Figure 13:
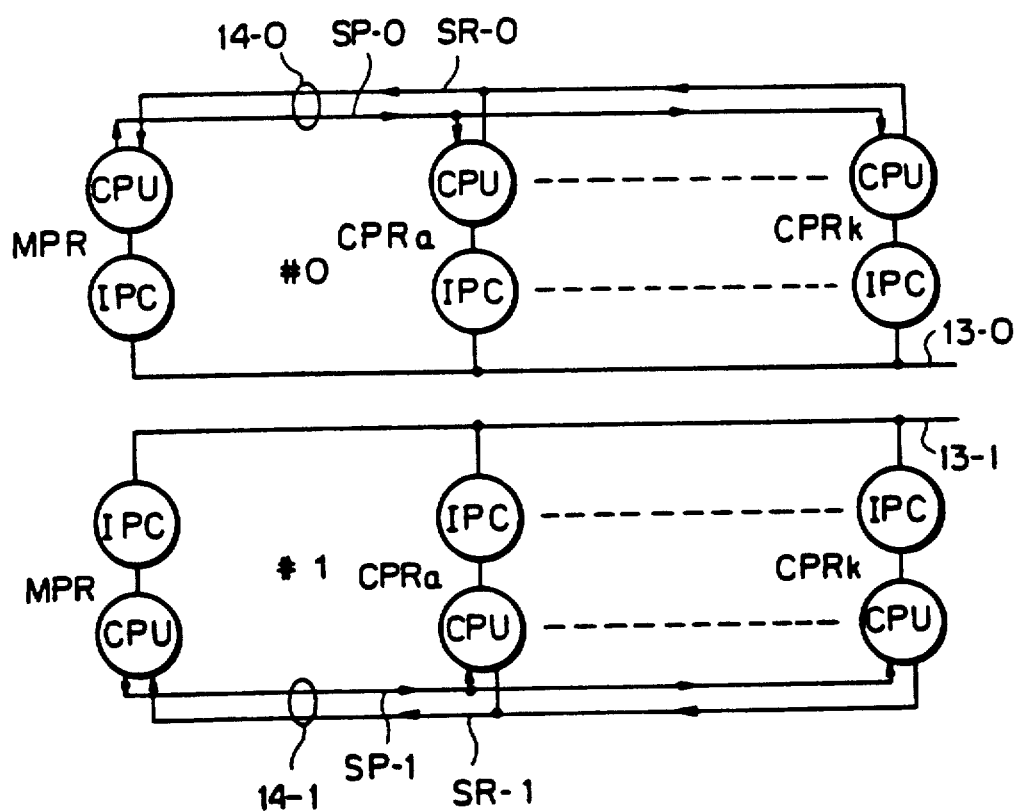
FIG. 13 shows schematically the method of system switching of the present invention according to the second embodiment.

FIG. 13 shows schematically the method of system switching of the present invention according to the second embodiment. In the figure, major parts are identical to FIG. 4. The portion above the communication buses 13-0 and 13-1 is the 0 system and the portion below is the 1 system, the two systems being shown separated. IPC indicates the inter multiprocessor communicator, already explained with reference to FIGS. 3A and 3B, the IPC connecting the management processor MPR#0 and the call processors $CPR_a$#0 to $CPR_k$#0 through the communication bus 13-0. Exactly the same construction applies to the 1 system as shown. In the figure, the central processing units CPU's are general names for the portions in the MPR's and CPR's, other than the IPC's, in FIG. 3A and FIG. 3B (that is, CC, ISC, MM, etc.) and are grouped together for the sake of simplification of illustration. The CPU's of the 0 system are connected by the system control bus 14-0, while the CPU's of the 1 system are connected by the system control bus 14-1. As with the system control buses, there are shown the system switching prediction signal lines SP (SP-0 and SP-1) and the system switching request signal lines SR (SR-0 and SR-1), which are of particular relevance to the second embodiment.

As a precondition of the first and second embodiment, it is considered that the instructions for system switching are performed primarily by the management processors MPR. Therefore, a system switching prediction signal line SP is used and the system switching prediction is performed uniformly for the call processors $CPR_a$ to $CPR_k$. Here, the second holding units (blocks referenced by 22 in FIG. 12) of each CPR are given a new system display. That is, those previously indicated as the 1 system (0 system) are given a display to the effect that they should be switched to the 0 system (1 system). After this, the required system switching is begun at the CPR's.

On the other hand, when system switching is requested due to a fault in the call processors CPR, since as a precondition of the present invention the instruction for system switching is handled primarily by the management processors MPR, the request is made by the transmission of the request signal Sr through the system switching request signal line SR to the main processors MPR. In this case, the first holding units of the MPR's (blocks referenced by 21 in FIG. 12) are given a new system display. That is, those previously indicated as the 1 system (0 system) are given a display requesting a switching to the 0 system (1 system). After this, the required system switching is begun for the whole system.

Figure 14A:
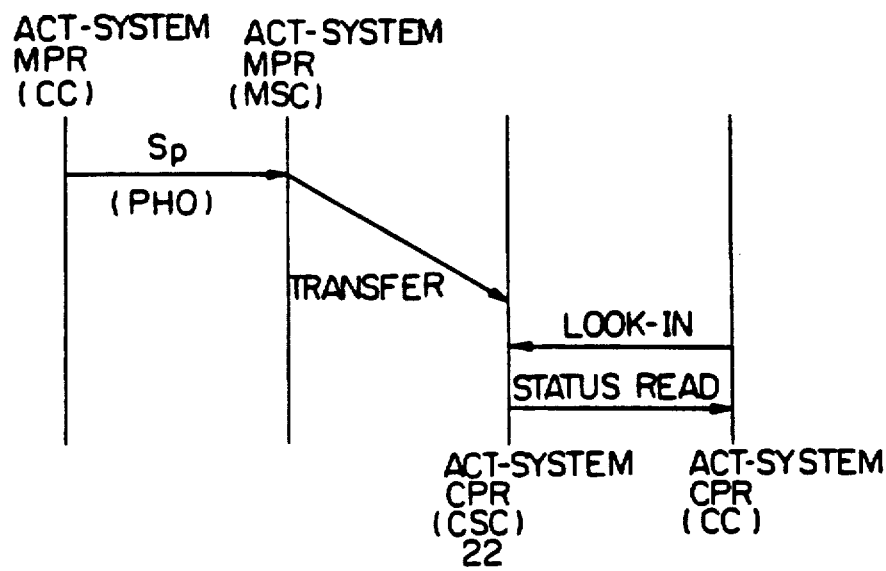
FIG. 14A shows an example of the flow of operation of the system switching prediction in the second embodiment.
Figure 14B:
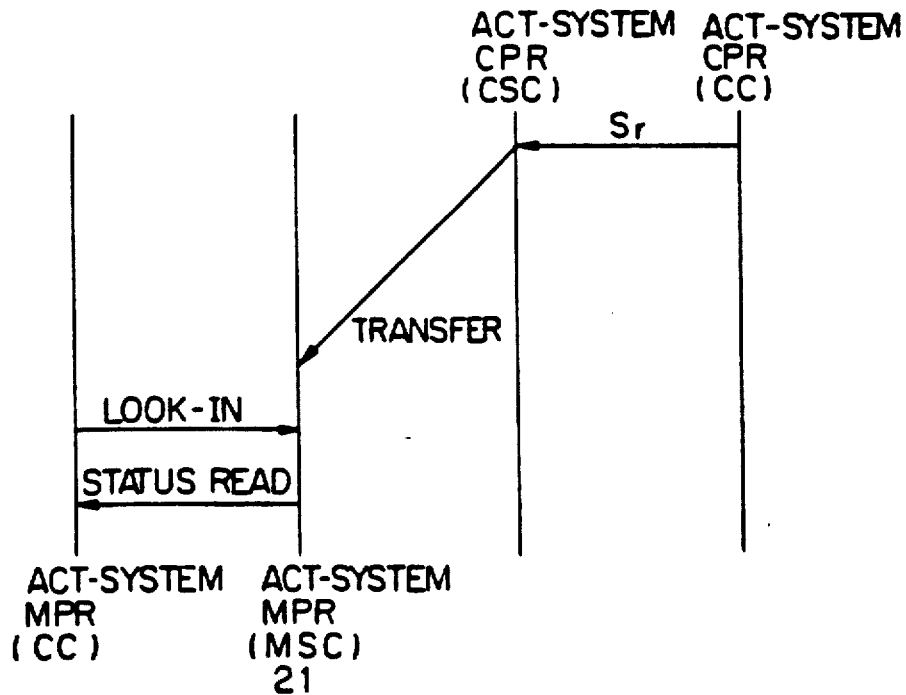
FIG. 14B shows an example of the operational flow of a system switching request in the second embodiment.

FIG. 14A shows an example of the flow of operation of the system switching prediction in the second embodiment. FIG. 14B shows an example of the operational flow of a system switching request in the second embodiment. First, looking at FIG. 14A, the central controller CC in the management processor MPR of the active system (for example, before periodic switching) transfers a system switching prediction signal Sp to the management processor side system reconfiguration controller MSC of the MPR. Next, the signal Sp is transferred on the system control bus and reaches the call processor side system reconfiguration controller CSC of the CPR's. Next, it is held by the second holding units 22 therein. Next, the CPR's supervise the second holding units 22 by "look-in" to read the status display by "status read". In this case, this is a prediction of a system switching and the previously explained corresponding operation is started. According to an example of the second embodiment, a "phase zero, PH0" instruction is used as the prediction signal Sp. This is convenient in use. Phases are usually classified into 0, 1, and 2, the greater the number indicating the greater the degree of fault. That is, PH2 is the highest level and requires processing of highest priority.

In an electronic switching system, in the PH2 set up mode, the exchange processing itself cannot be maintained. In PH1, there is a sudden switching despite the system being on-line, but current communication can be saved while dialing is cut off. In a PH0 switching, current communication can be saved and dialing can be saved, so the conversing parties will hardly notice anything in this set up mode. However, in the PH0 switching, a large amount of data must be transferred in a short time, in advance, to the standby system, which is crucial to a switching operation. A typical example of this PH0 switching is the afore-mentioned periodic switching.

Looking now at FIG. 14B, first, when a central controller CC in a call processor CPR of the active system detects by itself a fault in a portion other than the CC, since communication is impossible, it quickly gives a system switching request signal Sr to its internal call processor side system reconfiguration controller CSC and transfers it to the management processor side system reconfiguration controller MSC of the MPR through the system control bus 14. However, it is assumed that there is no abnormality on the transfer bus of the signal Sr in the CPR. (The case where the signal Sr itself cannot be transferred is not touched upon by the present invention, but sooner or later the fault of the CPR would be detected by the MPR due to the lack of a reply signal, etc.) The request signal Sr, upon reaching the MSC of the MPR, is held by the first holding unit 21 therein. Next, the MPR supervises the first holding unit 21 by "lock-in" to read the status display by "status read". In this case, there is a request for system switching. The MPR recognizes that a fault has occurred in one of the group of CPR's of the active system and changes over the system as a whole. Note that, in an example of the second embodiment, an IPSL bit is newly defined as corresponding to the request signal Sr and this used in the CPR. IPSL is a notation derived from "communication impossible".

Figure 15A:
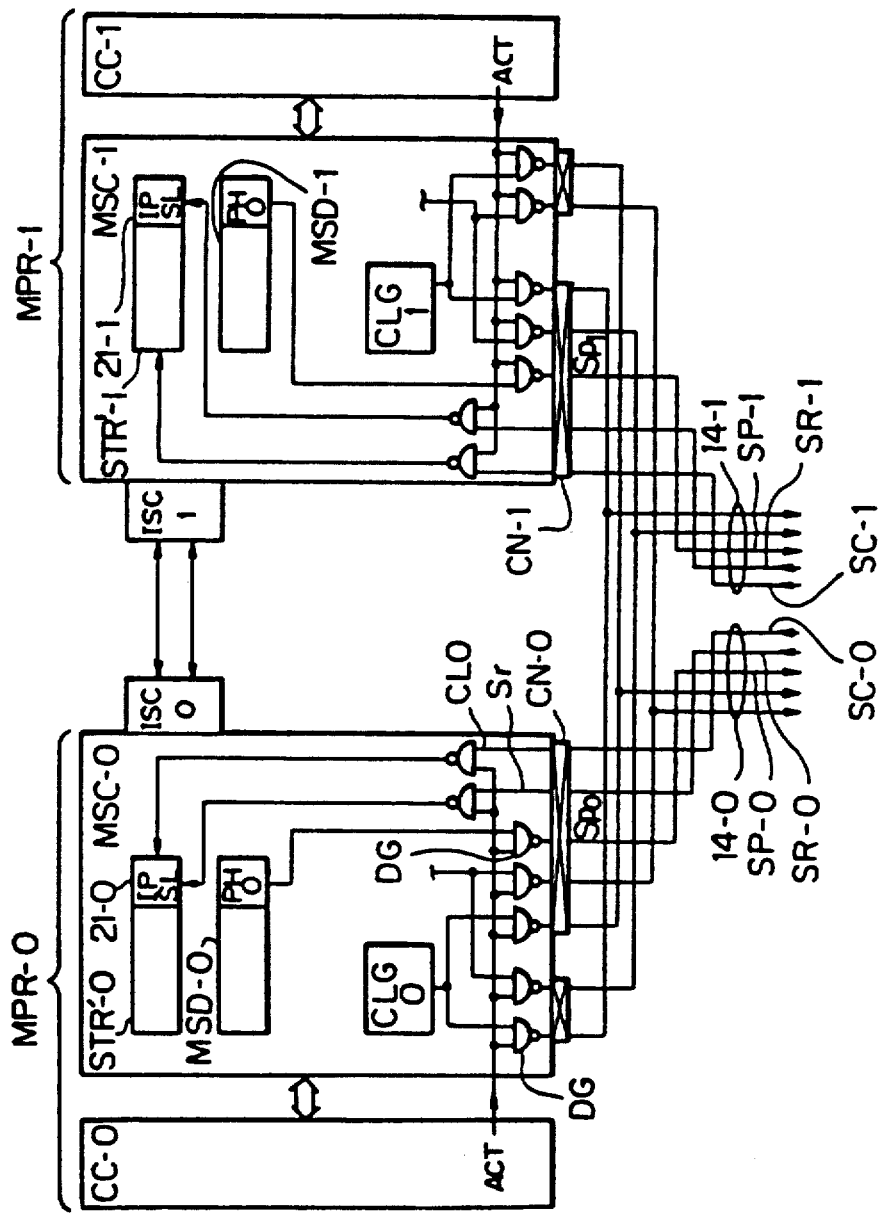
FIG. 15A shows examples of management processors provided with first holding units according to the second embodiment.
Figure 15B:
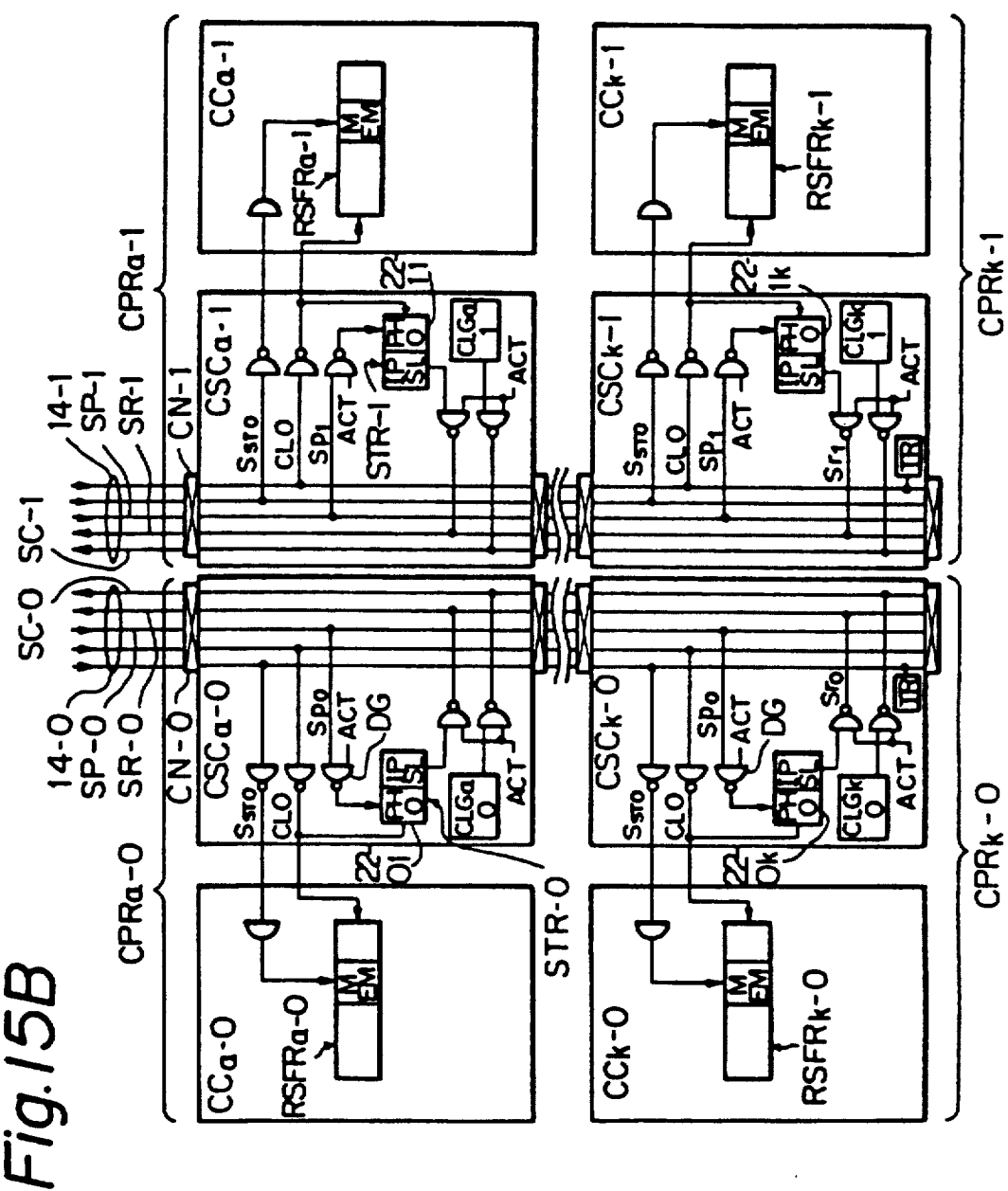
FIG. 15B shows examples of call processors provided with second holding units according to the second embodiment.

FIG. 15A shows examples of management processors MPR provided with first holding units 21 according to the second embodiment. FIG. 15B shows examples of call processors CPR provided with second holding units 22 according to the second embodiment. The portions of the two figures are connected by the system control bus 14-0 of the 0 system and the system control bus 14-1 of the 1 system. Among these, the system switching prediction signal lines SP-0 and SP-1 of the 0 system and the 1 system and the system switching request signal lines SR-0 and SR-1 of the 0 system and the 1 system are especially important. SC-0 and SC-1 are both synchronization signal transmission lines.

First, assume that a system switching prediction signal $S_p$ is sent from the management processor MPR-0. The origin of this prediction signal $S_p$, i.e., the prediction bit, is, for example, set in the driver MSD-0 (MSC signal driver) as the PH0 bit of FIG. 14A. From the corresponding driver gate DG, the signal is sent as the prediction signal Sp0 on the prediction signal line SP-0 to reach the call processor (CPR-0) of the 0 system.

On the call processor CPR side of FIG. 15B, the prediction signal Sp0 is taken in from the prediction signal line SP-0 to the system reconfiguration controllers $CSC_a$-0 to $CSC_k$-0. Through the respective driver gates DG, the prediction bits in the status registers MSD-0, for example, PH0, are turned ON ("1"). The central controllers ($CC_a$-0 to $CC_k$-0), as shown in FIG. 14A, perform "status read" by "look-in". The call processors CPR of the ACT system get ready for the coming of a system switching instruction.

Further, the system switching request shown in FIG. 14B is also performed from the call processor CPR side of FIG. 15B. For example, if the occurrence of a fault in the call processor $CPR_a$-0 is detected by the central controller $CC_a$-0, the IPSL bit (communication impossible bit) of the status register (STR'-0) is turned ON "1" immediately. This IPSL bit is sent from the corresponding driver gate DG as the request signal Sr0 on the request signal line SR-0. The same thing happens when a fault occurs in another call processor CPR (other than $CPR_a$-0). This request signal Sr0 is sent to the processor MPR-0, but at that time the synchronization signal CL0 from the clock generator $CLG_a0$ is also sent through the synchronization signal transmission line SC-0.

The management processor MPR-0 of FIG. 15A sets the synchronization signal CL0 and the request signal Sr0 in the status register STR'-0 and turns the IPSL bit ON "1".

In FIG. 15B, CN-0 and CN-1 are connectors and CLG0 and CLG1 are clock generators of the MPR system. In FIG. 15B, $RSFR_a$-0, $RSFR_1$-1, $RSFR_x0$, etc. are restart flag registers and are used, in the occurrence of a fault, to receive a system switching instruction $S_{STO}$ from an MPR. MEM is a bit indicating "emergency" of the MPR. The clock used at this time is CL.

Finally, several examples of the operation of the second embodiment will be given.

(1) PH0 restart (periodic switching, switching by command)
(2) Fault in IPC of CPR: PH0
(3) Fault in IPC of MPR: PH0
(4) Fault in CPR: PH1

Figure 16A:
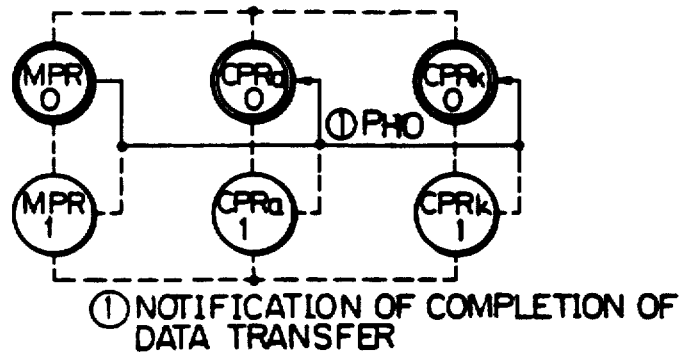
FIGS. 16A to 16D show the system transition upon zero phase control (i.e., PH0) restart.
Figure 16B:
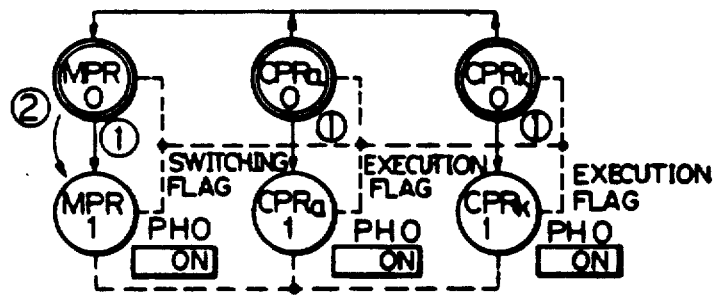
Figure 16C:
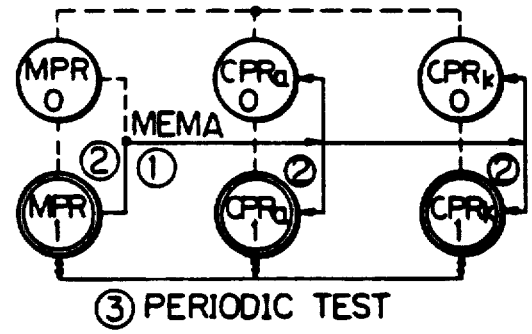
Figure 16D:
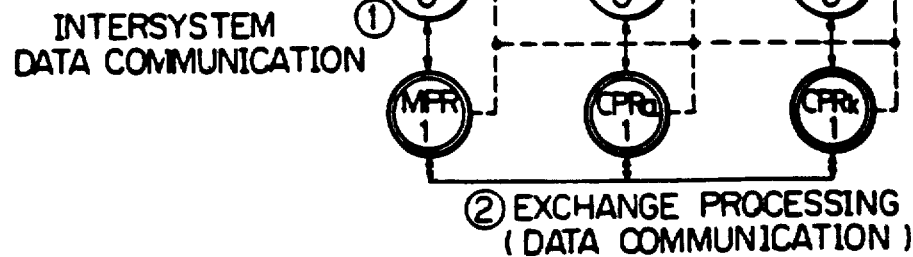

FIGS. 16A to 16D show the system transition upon PH0 restart. The order of transition is, from the top, 16A→16B→16C→16D. The transition charts are drawn according to the system construction of FIG. 13. In the lines connecting the MPR's and CPR's, no special operation occurs on the dotted line portions; action occurs only on the solid line portions. The same is true for the following FIGS. 17A to 19D. In FIG. 16A, a PH0 switching request is made from an MPR to all the CPR's through the system control bus 14. However, the PH0 switching request is performed only for the CPR's of the ACT system. In FIG. 16B, ①indicates notification of the completion of the data transfer. CPR performs the data transfer processing and, upon the completion of the data transfer, turns the PH0 execution flag of the SBY (standby) system ON and notifies the MPR through the IPC of the completion of the data transfer. Further, the data transfer operation is achieved, and when the data transfer operation is completed, the PH0 switching flag is turned ON ("1"). At ②, when the MPR receives the data transfer completion message from all the CPR's, it executes the A/S (Active/Standby) switching upon the overflow of the FDT (fault detection timer) with a timing-out (1 second). In FIG. 16C, ①is an MPR side emergency (MEMA). The MPR notifies all CPR's of the emergency and, at ②, performs PH0 restart by the PH0 switching flag turning ON. ③ shows a periodic test which is performed by the communication bus 13. In FIG. 16D, ①indicates intersystem data communication and ② exchange processing (data communication). If the periodic test shows the system is normal, the system enters on-line processing.

Figure 17A:
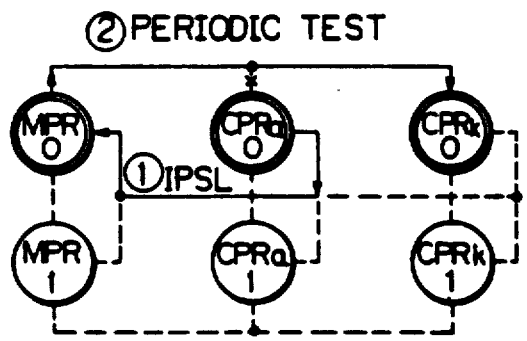
FIGS. 17A to 17D show the system transition in the case of a fault in the IPC of a CPR.
Figure 17B:
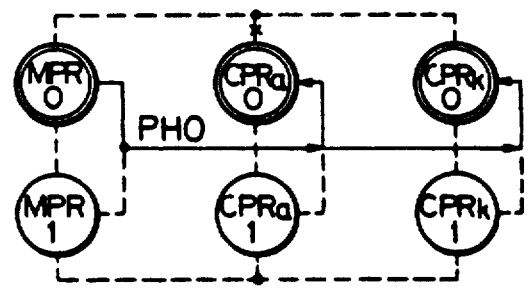
Figure 17C:
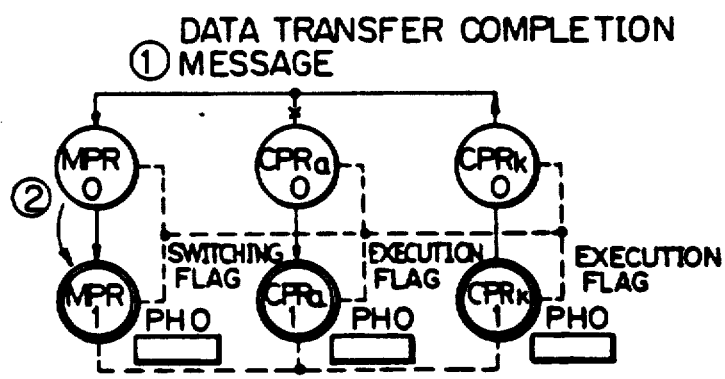
Figure 17D:
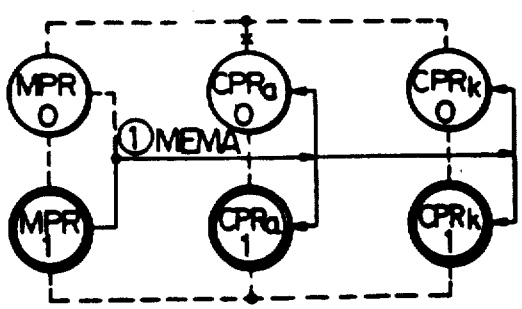

FIGS. 17A to 17D show the system transition in the case of a fault in the IPC of a CPR. In FIG. 17A, at ①, the MPR enters a periodic test by the reception of communication impossible data (IPSL) from a CPR. ② shows a periodic test. When this test is impossible for $CPR_a$, a judgement is made that there is a fault in the $CPR_a$. In FIG. 17B, the MPR makes a PH0 switching request to all the CPR's of the ACT system through the system control bus 14. In FIG. 17C, ①indicates a data transfer completion message. The CPR cannot send a data transfer completion message to the MPR. In ②, the MPR activates the emergency (MEMA) by a software timing of 1 second and performs A/S switching. The solid line in FIG. 17D is the MPR side emergency (MEMA). The MPR notifies all CPR's of the emergency and performs periodic tests.

Figure 18A:
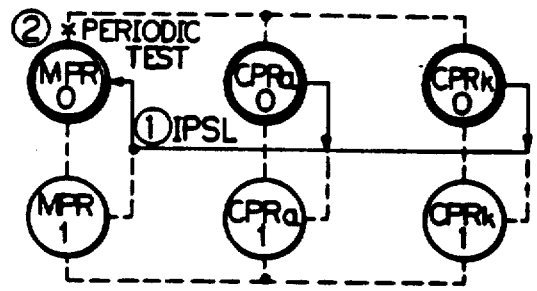
FIGS. 18A to 18D show the system transition in the case of a fault in the IPC of the MPR.
Figure 18B:
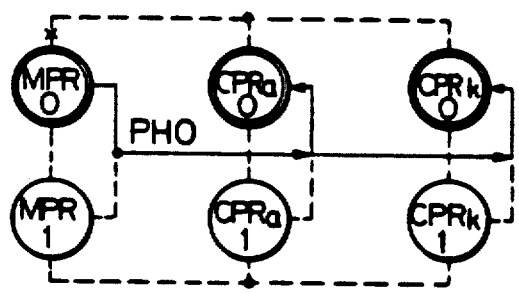
Figure 18C:
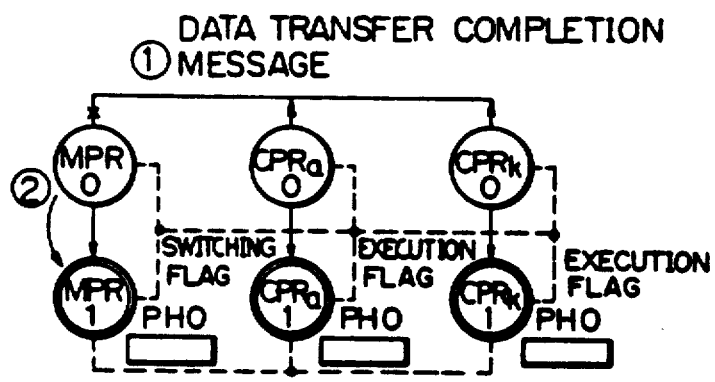
Figure 18D:
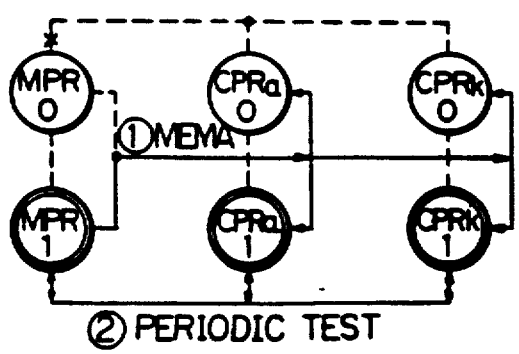

FIGS. 18A to 18D show the system transition in the case of a fault in the IPC of the MPR. In FIG. 18A, at ①, the MPR performs a periodic test through the communication bus 13 by reception of communication impossible data (IPSL) from a CPR. At ②, it is recognized that there is a fault in the IPC of the MPR since the MPR cannot test all CPR's. Note that there are cases where the MPR itself detects a fault. In FIG. 18B, MPR makes a PH0 switching request to all the CPR's in the ACT system via the system control bus 14. In FIG. 18C, ①is a data transfer completion message. Transmission of a data transfer completion message from the CPR to the MPR is not possible. At ②, the MPR activates the emergency MEMA by a software timing of 1 second and performs the A/S switching. In this case, the communication bus 13 cannot be used, so the MPR sends the PH0 instruction to all the CPR's, then performs the A/S switching using a timing of its own software timer. In FIG. 18D, ①is an MPR side emergency (MEMA) and ② is a periodic test. At ①, the MRP notifies all CPR's of the emergency and the CPR's perform the PH0 restart by the PH0 switching flag turning ON. At ②, a periodic test is performed through the communication bus 13.

Figure 19A:
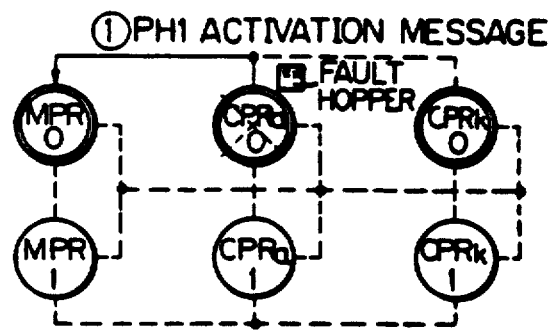
FIGS. 19A to 19D are views of system transitions in the case of a fault in a call processor CPR.
Figure 19B:
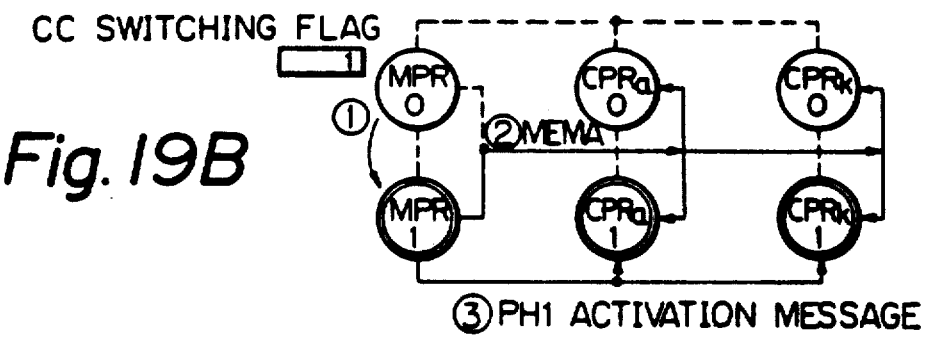
Figure 19C:
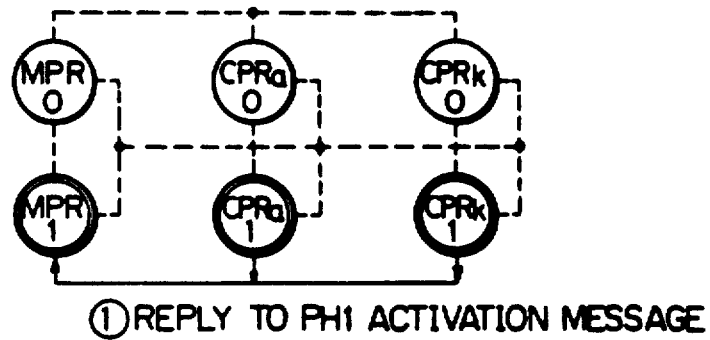
Figure 19D:
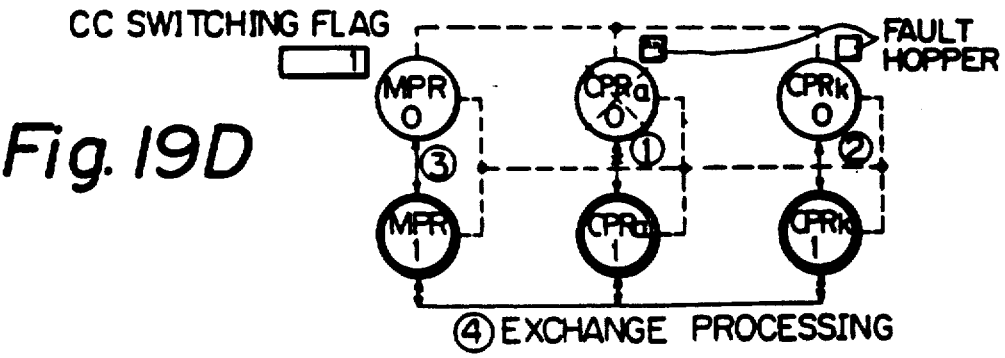

FIGS. 19A to 19D are views of system transitions in the case of a fault in a CPR. The solid line in FIG. 19A is a PH1 activation message. First, when an overflow of the FDT (fault detection timer) occurs at the $CPR_a$ (0 system), the reason for the fault is written in the fault hopper of the $CPR_a$ (0 system). The $CPR_a$ sends to the MPR, a PH1 execution message. At the MPR, and A/S bit is rewritten by the emergency circuit. In FIG. 19B at ①, at the MPR, the EMA circuit is activated by FDT overflow upon reception of a PH1 execution message. ② is an MPR side emergency (MEMA). The MPR notifies all the CPR's of the emergency. At ③, the MPR sends to all the CPR's a PH1 execution message. The solid line in FIG. 19C is a reply to the PH1 execution message. The MPR performs PH1 restart processing by the receipt from all CPR's of a PH1 execution message reply. In FIG. 19D, at ①, the $CPR_a$ goes down alone since the reason for the fault is written in the fault hopper. At ②, on the other hand, the $CPR_k$ engages in a copy operation since nothing is written in the fault hopper. At ③, the MPR engages in a copy operation since the CC switching flag is written. At ④, exchange processing (data communication) is executed.

As explained in detail above, according to the second embodiment of the present invention, respective duplexed multiprocessors can execute switching from the 0 system to the 1 system or vice versa without the software management becoming complicated and without the introduction of complicated hardware. Use of an electronic switching system results in much greater effectiveness of the overall system.

Although certain preferred embodiments have been shown and described, it should be understood that many changes and modifications may be made therein without departing from the scope of the appended claims.

What is claimed is:

1. A multi-processor system for controlling a switching network including networks, comprising:

a first system having an active state and a standby state and including a first system bus;

a first plurality of secondary processors, respectively connected to the first system bus, for processing information and communicating with secondary processors of said first plurality of secondary processors, and each of said first plurality of secondary processors connected to and controlling a first corresponding network of the switching network;

a first main processor, connected to the first system bus, for communicating with the first plurality of secondary processors and for governing and managing the first plurality of secondary processors;

a second system having an active state and a standby state and including a second system bus;

a second plurality of secondary processors, respectively connected to the second system bus, for processing information and communicating with secondary processors of said second plurality of secondary processors, and each of said second plurality of secondary processors connected to and controlling a second corresponding network of the switching network;

a second main processor, connected to the second system bus, for communicating with the second plurality of secondary processors and for governing and managing the second plurality of secondary processors; wherein said first and second main processors, said first and second pluralities of secondary processors and said first and second system buses are duplexed;

each of said first and second main processors includes first means, operatively connected to each other, for detecting a fault among a corresponding one of the first system and second system, for transmitting a system switching command due to a fault being detected, for transmitting the system switching command to a corresponding one of the first system bus and the second system bus, and for switching a corresponding one of the first and second main processors between the active state and the standby state, and each of said first and second pluralities of secondary processors includes second means for receiving the system switching command via a corresponding one of the first system bus and second system bus, and for switching an associated one of the first and second plurality of secondary processors between the active state and the standby state.

2. A multiprocessor system as set forth in claim 1, wherein each of said first means includes a system switching instruction means for instructing a corresponding plurality of secondary processors to execute system switching between the active state and the standby state in accordance with a first system switching signal, and system switching notification means for notifying said corresponding plurality of secondary processors of issuance of the first system switching signal for system switching in accordance with a second system switching signal, each of said second means includes a system switching display means for receiving an instruction for system switching from a corresponding first means and for displaying the instruction, and each of said secondary processors includes means for receiving notice from said corresponding system switching notification means and for executing system switching in response to the instruction received by the corresponding system switching display means.

3. A multiprocessor system as set forth in claim 2, wherein:

each of said main processors is designated as a management processor and includes a central controller, a management processor side system reconfiguration controller, and an interface subsystem controller, each of said secondary processors is designated as a call processor and includes a central controller and call processor side system reconfiguration controller means for producing control information for system reconfiguration when the multiprocessor system is initialized, each said interface subsystem controller contains therein a corresponding one of said system switching instruction means, each said management processor side system reconfiguration controller contains therein a corresponding one of said system switching notification means, and each said central controller associated with one of said secondary processors includes therein a corresponding one of said system switching display means.

4. A multiprocessor system as set forth in claim 3, wherein the first and second system buses each include active and standby system buses, the management processor includes active and standby system management processors, the call processor includes active and standby system call processors the active system management process and corresponding active system call processors are connected in common, via said active system bus of one of said first and second system buses, which includes a system switching instruction signal line and a system switching notification signal line, and the standby system management processor and corresponding standby system call processors are connected in common, via said standby system bus of another of said first and second system buses which includes another system switching instruction signal line and another system switching notification signal line.

5. A multiprocessor system as set forth in claim 4, further comprising a latch circuit means, operatively connected between the active system and the standby system interface subsystem controllers of the management processors, for ensuring that if one system is the active system the other necessarily becomes the standby system.

6. A multiprocessor system as set forth in claim 5, wherein each of said first means includes means for issuing a prediction signal to said corresponding second means for executing system switching, said prediction signal indicates that system switching is to be executed between said active state and said standby state, wherein each of said second means includes a prediction holding means for receiving and storing the prediction signal, and each of said second means includes means for issuing a request signal to said corresponding first means, said request signal requesting system switching to be executed between the active state and the standby state, and each of said first means includes a request holding means for receiving and storing the request signal, and said main processors include main supervising means for supervising each of said request holding means, said secondary processors include secondary supervising means for supervising each of said prediction holding means, said main supervising means and said secondary supervising means supervising to initiate system switching according to detections of said request signal and said prediction signal stored in each of said request holding means and each of said prediction holding means, respectively.

7. A multiprocessor system as set forth in claim 6, wherein each of said first and second system buses includes a corresponding system switching prediction signal line commonly connected to each of said active and standby system management processors, and a system switching request signal line commonly connected to each of said active and standby system management processors.

8. A multiprocessor system as set forth in claim 7, wherein each of said main supervising means includes means for periodically reading a status of each of said request holding means; and
    wherein each of said secondary supervising means includes means for periodically reading a status of each of said prediction holding means.

9. A multiprocessor system as set forth in claim 8, wherein each of said request holding means and said prediction holding means includes one of a flag register and a status register.

10. A multiprocessor system as set forth in claim 8, wherein each of said first means includes means for generating said prediction signal as a phase zero instruction for saving current communication and dialing.

11. A multiprocessor system as set forth in claim 8, wherein each of said second means includes means for providing said request signal, via one of the first and second system buses, to the management processor side system reconfiguration controller, wherein said request signal indicates that normal communication can no longer be maintained.

12. A multiprocessor system as set forth in claim 3, wherein each of said system switching notification means comprises an emergency action designation register having an emergency bit which becomes logic "1" when an abnormality occurs.

13. A multiprocessor system as set forth in claim 3, wherein each of said system switching display means includes a mode register having an active/standby bit used for display of the instruction received from said corresponding first means.

14. A multiprocessor system for controlling a switching network including networks, comprising:
    two main processors each having an active state and a standby state;
    a plurality of secondary processors each connected to and controlling a corresponding network of the switching network, and each of said plurality of secondary processors having an active state and a standby state, wherein each of said main processors is associated with a corresponding plurality of said secondary processors;
    two system buses, connected between respective ones of said main processors and said corresponding plurality of secondary processors, each of said system buses having an active state and a standby state, and each of said system buses including a control bus and a communication bus;
    wherein each of said main processors includes means for controlling said corresponding plurality of secondary processors, so that communication between said secondary processors is possible only between secondary processors of said corresponding plurality of secondary processors associated with each of said main processors;
    two first means, respectively connected to each other rand a corresponding one of said main processors, for providing an instruction command to said corresponding secondary processors, and for providing data to one of said main processors to ensure proper secondary processor switching; and
    second means, respectively connected to a corresponding one of said secondary processors, for switching said corresponding one of said secondary processors from the active state to the standby state in response to receiving said instruction command from a corresponding one of said two first means.

15. A multiprocessor system as set forth in claim 14, wherein each of said first means includes system switching instruction means for issuing said instruction command, and system switching notification means for issuing a notification command which informs said corresponding plurality of secondary processors or issuance of said instruction command;
    each of said second means includes system switching display means for receiving and displaying said instruction command,
    where each of said secondary processors receives said notification command from a corresponding system switching notification means indicating the issuance of said instruction command and said second means executes the switching of said corresponding one of said secondary processors between the active state and the standby state in response to said instruction command.

16. A multiprocessor system as set forth in claim 15, wherein each of said main processors is designated as a management processor and each of said corresponding plurality of secondary processors is designated as a corresponding plurality of call processors, said call processors being associated with a corresponding management processor;
    wherein each said management processor includes:
        central control means for controlling issuance of said instruction command and said notification command; and
        interface subsystem controller means for providing data to one of said management processors is preparation for said switching;
    wherein each said call processor includes:
        central control means for controlling issuance of a switching signal from said call processors to said corresponding management processor; and
        call processor side system reconfiguration controller means for producing said switching signal, for initiating said system switching and for receiving said notification command.

17. A multiprocessor system as set forth in claim 16, wherein a first of said management processors is connected to said interface subsystem controller means of a second of said management processors so that one system is in the active state, and the other system is in the standby state.

18. A multiprocessor system as set forth in claim 17, wherein each of said first means includes means for issuing a prediction signal to said corresponding second means prior to switching between said active state and said standby state, and each of said second means includes means for issuing a request signal to said corresponding first means requesting that switching occur between said active state and said standby state;
    each of said first means includes request holding means for receiving and storing said request signal, and each of said second means includes prediction holding means for receiving and storing said prediction signal;
    wherein said corresponding main processor detects receipt of said request signal and initiates system switching upon said receipt of said request signal and said secondary processors detect receipt of said prediction signal and initiate switching of said secondary processors upon said receipt of said prediction signal.

19. A multiprocessor system as set forth in claim 18, wherein said management processor in the active state and said corresponding plurality of call processors are commonly connected via the active state of one of said system control buses, which includes a system switching prediction signal line and a system switching request signal line;

said management processor in the standby state and said corresponding plurality of call processors are commonly connected via the standby state of one of said system control buses, which includes a system switching prediction signal line and a system switching request signal line;

said system switching prediction signal lines in said active state are commonly connected to each of said active and standby system management processors;

said system switching request signal lines in said active state are commonly connected to each of said active and standby system management processors.

20. A multiprocessor system as set forth in claim 19, wherein each of said first means includes means for supervising each of said request holding means responsive to periodically reading a status of each of said request holding means;

each of said second means includes means for supervising each of said prediction holding means responsive to periodically reading a status of each of said prediction holding means.

21. A multiprocessor system as set forth in claim 20, wherein each of said management processors includes synchronization clock generator means for generating a synchronization clock signal which synchronizes transfer of signals between said call processor side system reconfiguration controller means of the active system and said call processor side system reconfiguration controller means of the standby system.

* * * * *

UNITED STATES PATENT AND TRADEMARK OFFICE
CERTIFICATE OF CORRECTION

PATENT NO.   : 5,251,299                           Page 1 of 2
DATED        : October 5, 1993
INVENTOR(S)  : MASUDA et al.

It is certified that error appears in the above-indentified patent and that said Letters Patent is hereby corrected as shown below:

Title page, item [56] References Cited, under U.S. PATENT DOCUMENTS, replace the current list with the following, which includes those references in chronological order:

| | | | |
|---|---|---|---|
| 3,806,887 | 4/1974 | Schulte et al. | 364/200 |
| 3,818,455 | 6/1974 | Brenski et al | 364/200 |
| 3,838,261 | 9/1974 | Rice et al. | 364/200 |
| 3,882,455 | 5/1975 | Heck et al. | 364/200 |
| 3,921,141 | 11/1975 | Wilber et al. | 364/200 |
| 4,455,601 | 6/1984 | Griscom et al. | 395/575 |
| 4,466,062 | 8/1984 | Krikor | 364/200 |
| 4,564,900 | 1/1986 | Smitt | 364/200 |
| 4,608,688 | 8/1986 | Hansen et al. | 371/11 |
| 4,654,784 | 3/1987 | Campanini | 395/325 |
| 4,674,036 | 6/1987 | Conforti | 364/200 |
| 4,631,661 | 12/1986 | Eibach et al. | 364/200 |
| 4,551,836 | 11/1985 | Parikh | 371/1 |
| 4,713,793 | 12/1987 | Conforti | 364/900 |
| 4,432,054 | 2/1984 | Okada et al | 364/200 |
| 4,374,414 | 2/1983 | Comfort et al | 364/200 |

Col. 1, line 38, change "system" to —systems—
line 45, change "as" to —a—
Col. 6, line 68, change "particularly" to —particular—
Col. 7, line 33, change "15" to —17—
Col. 8, line 25, delete "(Standby)".
line 26, delete "(Standby)".

UNITED STATES PATENT AND TRADEMARK OFFICE
CERTIFICATE OF CORRECTION

PATENT NO. : 5,251,299

DATED : October 5, 1993

INVENTOR(S) : MASUDA et al.

It is certified that error appears in the above-indentified patent and that said Letters Patent is hereby corrected as shown below:

Col. 10, line 40, change "=" to --→--.

Col. 11, line 5, change "a CPR's read the" to --the CPR's read a--.

Col. 12, line 14, after "invention" insert --,--.

Col. 13, line 33, change "process" to --processor--;
line 41, change "process" to --processor--.

Col. 14, line 3, change "processor" to --processors 11--;
line 4, change "process" to --processor--.

Col. 20, line 14, after "processors" insert --,--.

Col. 22, line 9, change "or" to --of--;

Signed and Sealed this

Twenty-first Day of February, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT : 5,251,299
DATED : Oct. 5, 1993
INVENTOR(S) : Hiroki Masuda

It is certified that error appears in the above-identified patent and that said Letters Patent is hereby corrected as shown below:

Col. 22, line 27, change "corresponding plurality of call processors" to read -- call processor--.

Col. 21, line 60, " rand should read --and--.

Signed and Sealed this

Eleventh Day of April, 1995

Attest:

BRUCE LEHMAN

Attesting Officer    Commissioner of Patents and Trademarks